(12) United States Patent
Sakai

(10) Patent No.: US 6,920,789 B2
(45) Date of Patent: Jul. 26, 2005

(54) SYSTEM FOR WATCHING AND FORECASTING CHANGES IN NATURAL PHENOMENA AND WEATHER BASED ON SOUNDS FROM THE EARTH

(75) Inventor: Yokio Sakai, 7-12, Higashiaramachi 3-chome, Nagaoka-shi, Niigata-ken 940-0022 (JP)

(73) Assignee: Yokio Sakai, Niigata-ken (JP)

( * ) Notice: Subject to any disclaimer, the term of this patent is extended or adjusted under 35 U.S.C. 154(b) by 0 days.

(21) Appl. No.: 10/185,017

(22) Filed: Jul. 1, 2002

(65) Prior Publication Data

US 2004/0000194 A1 Jan. 1, 2004

(51) Int. Cl.$^7$ .................. G01H 13/00; G01H 17/00
(52) U.S. Cl. .................. 73/587; 73/594; 73/602; 73/170.16
(58) Field of Search .................. 73/579, 587, 594, 73/597, 600, 602, 170.16, 170.17, 170.28

(56) References Cited

U.S. PATENT DOCUMENTS

| | | | | |
|---|---|---|---|---|
| 4,580,814 A | * | 4/1986 | Berler | 283/67 |
| 5,122,805 A | * | 6/1992 | Peterman et al. | 342/26 |
| 5,406,481 A | * | 4/1995 | Shinozawa et al. | 702/3 |
| 5,504,714 A | * | 4/1996 | Shonting | 367/13 |
| 5,625,348 A | * | 4/1997 | Farnsworth et al. | 340/690 |
| 5,675,088 A | * | 10/1997 | Serata | 73/784 |
| 5,943,629 A | * | 8/1999 | Ballard et al. | 702/2 |
| 6,427,535 B1 | * | 8/2002 | Sakai et al. | 73/587 |

FOREIGN PATENT DOCUMENTS

| | | | | |
|---|---|---|---|---|
| JP | 2001153967 A | * | 6/2001 | G01W/1/10 |
| JP | 2002328179 A | * | 11/2002 | G01W/1/10 |
| WO | WO 96/18119 | * | 6/1996 | G01V/3/08 |

OTHER PUBLICATIONS

"Adaptative learning numerical weather forecasting model", Oct. 1, 2001, IBM Technical Disclosure Bulletin, UK, Issue 450, p. 1746.*
Co–pending U.S. Appl. No. 09/718,491, filed on Nov. 24, 2000, Sakai et al.

* cited by examiner

Primary Examiner—Hezron Williams
Assistant Examiner—Rose M. Miller
(74) Attorney, Agent, or Firm—Paul A. Guss

(57) ABSTRACT

A vibration sensor mounted on a tree on the earth outputs a signal voltage corresponding to a sound from the earth. The signal voltage is continuously measured by a sound observing device and read into a data processing device. The data processing device has a forecasting unit which performs a long-term weather forecasting process based on the value of the signal voltage, i.e., a sound pressure level representing the magnitude of the sound pressure of the sound from the earth. Specifically, the forecasting unit forecasts long-term weather conditions such as warm and cold climates related to high and low temperatures three and six months after the measurement of the sound from the earth, based on changes in the sound pressure level of the measured sound.

10 Claims, 33 Drawing Sheets

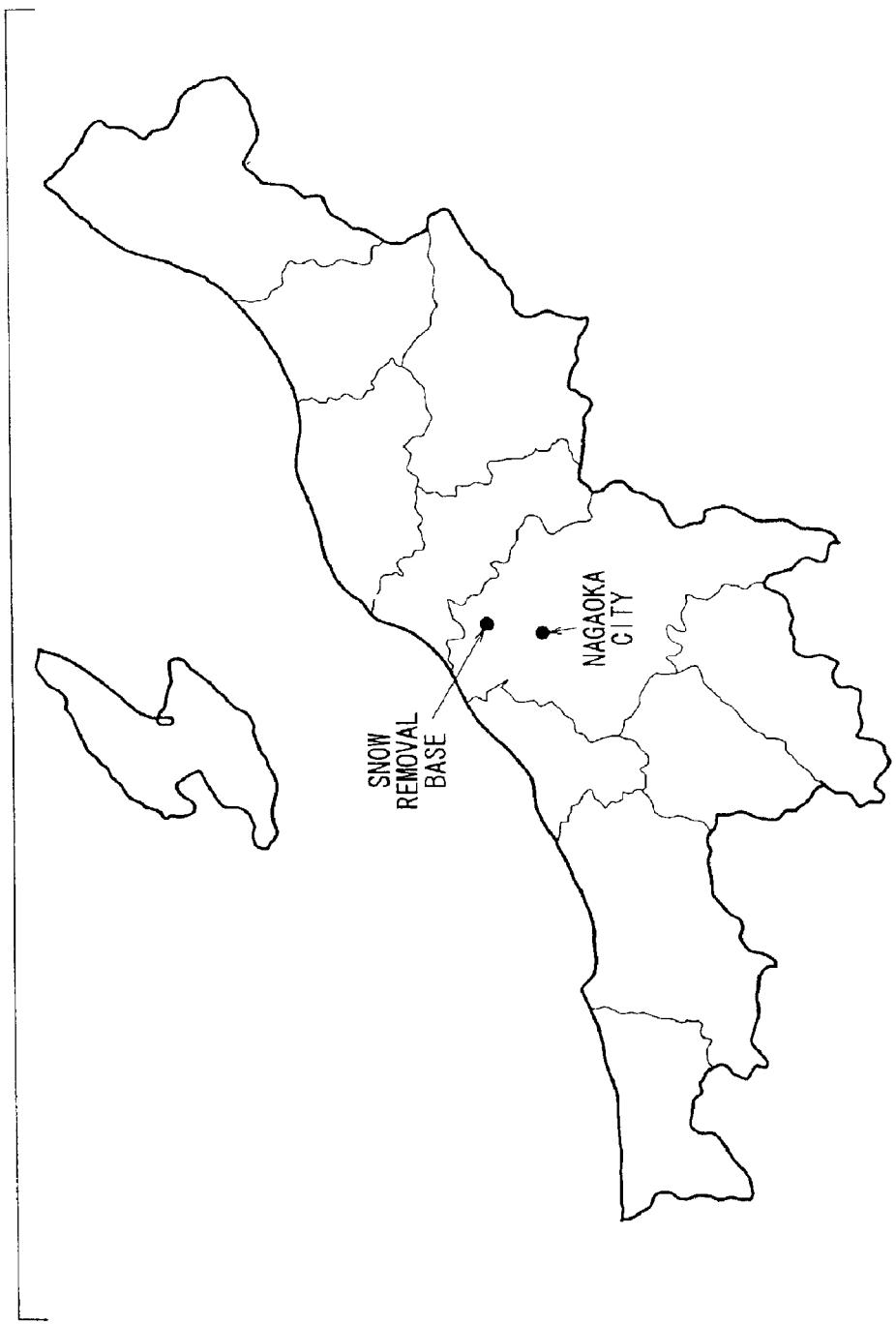

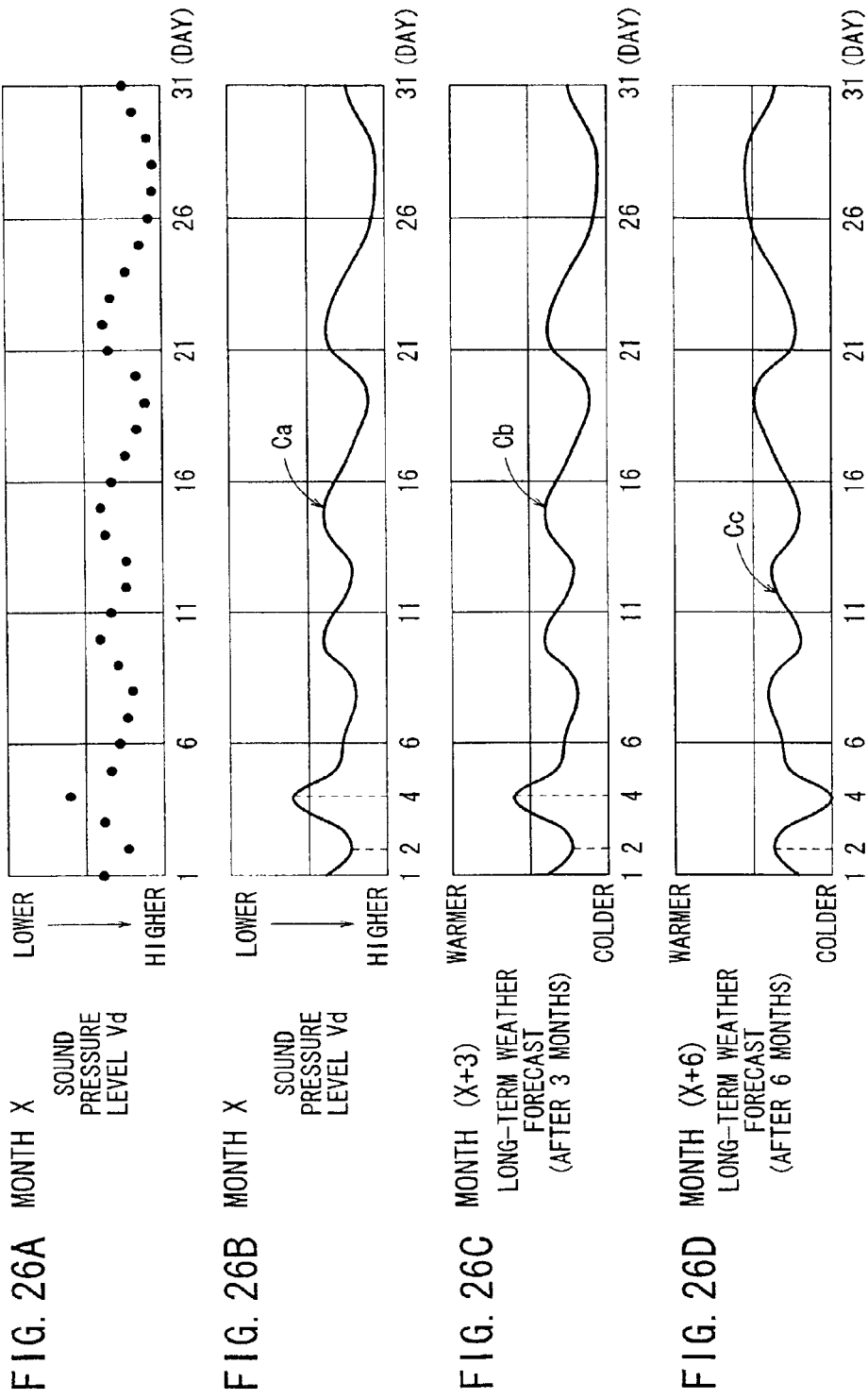

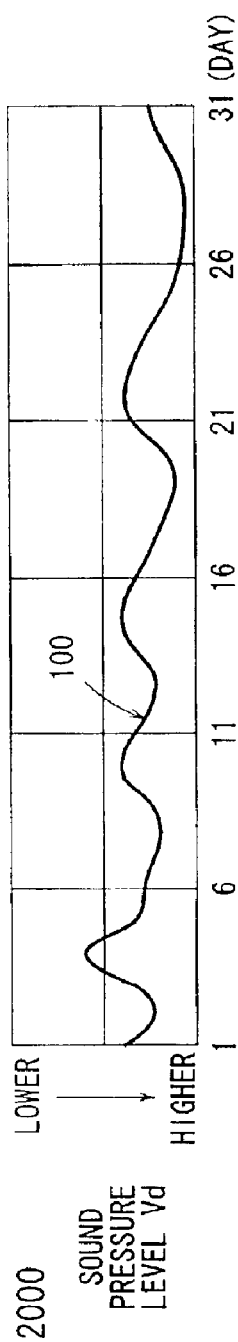
FIG. 27A AUGUST, 2000
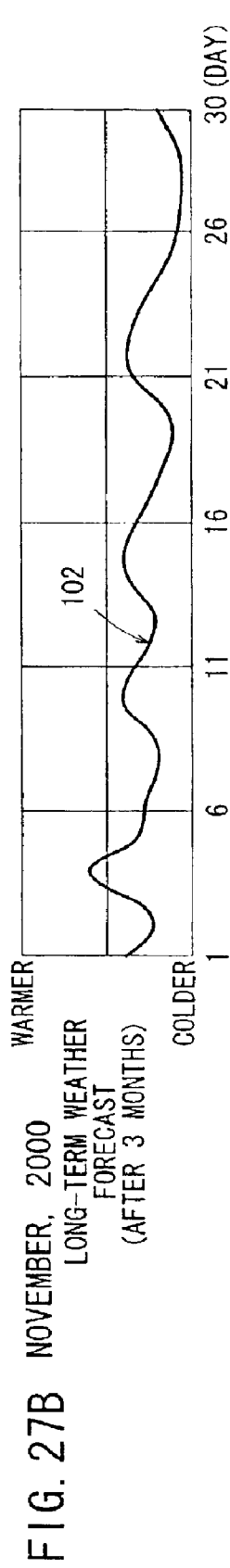
FIG. 27B NOVEMBER, 2000
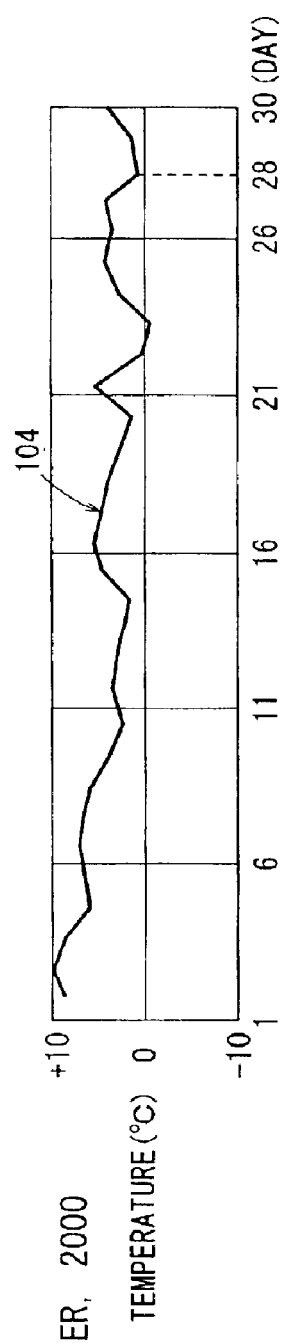
FIG. 27C NOVEMBER, 2000

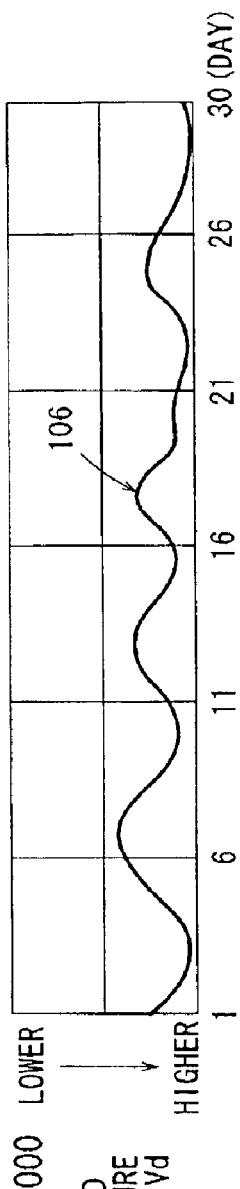
FIG. 28A SEPTEMBER, 2000
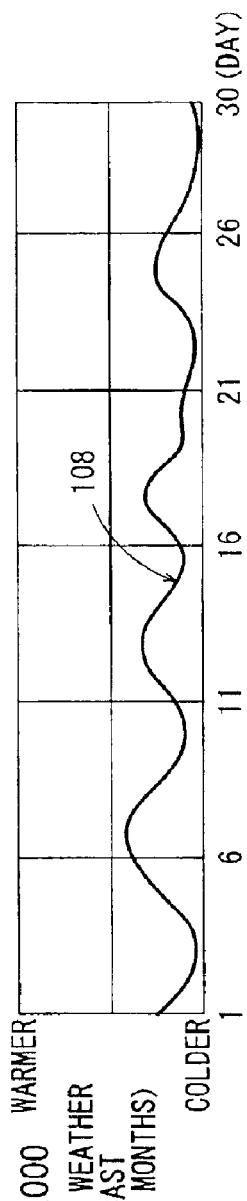
FIG. 28B DECEMBER, 2000
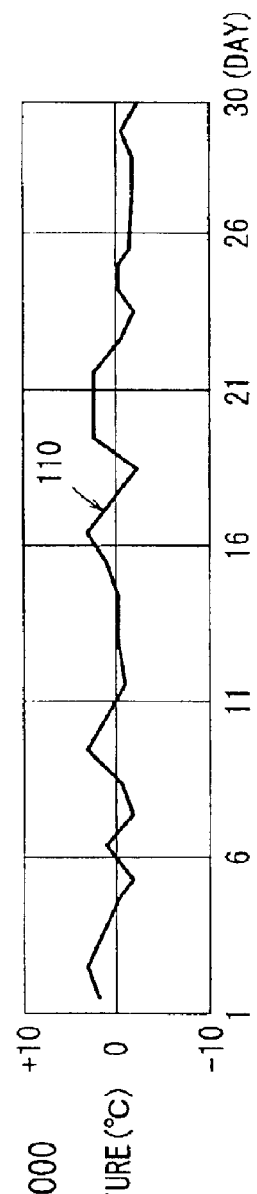
FIG. 28C DECEMBER, 2000

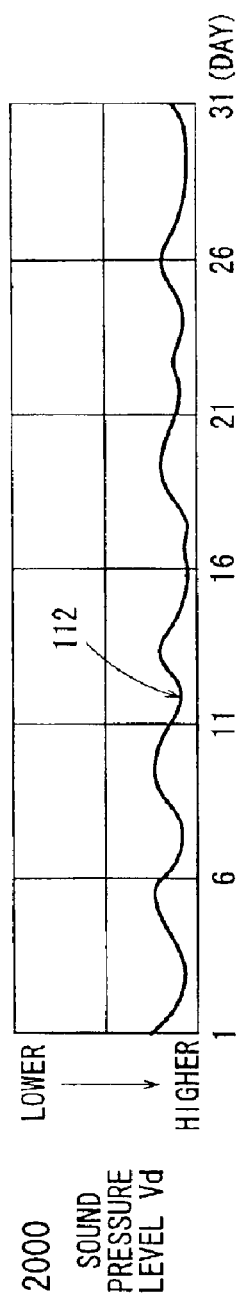
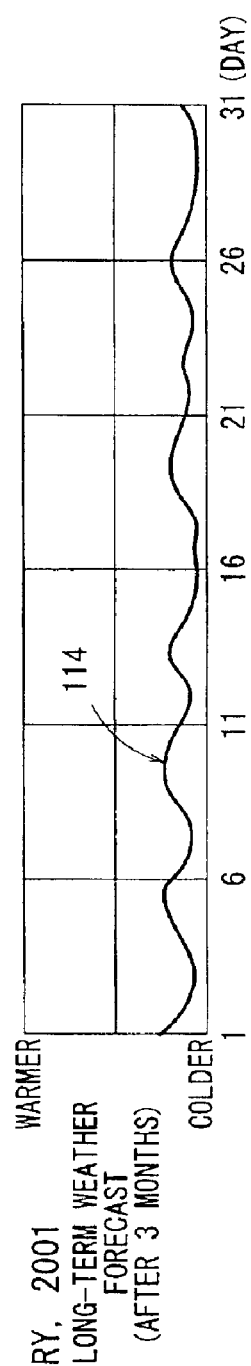
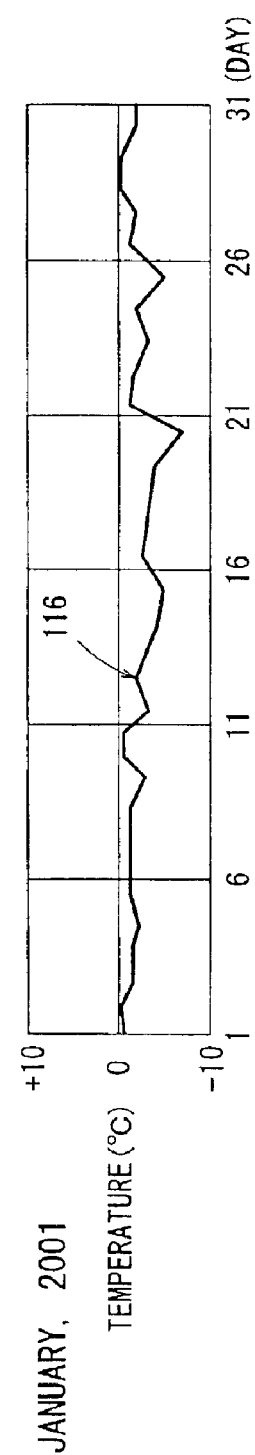
FIG. 29A  OCTOBER, 2000
FIG. 29B  JANUARY, 2001 LONG-TERM WEATHER FORECAST (AFTER 3 MONTHS)
FIG. 29C  JANUARY, 2001

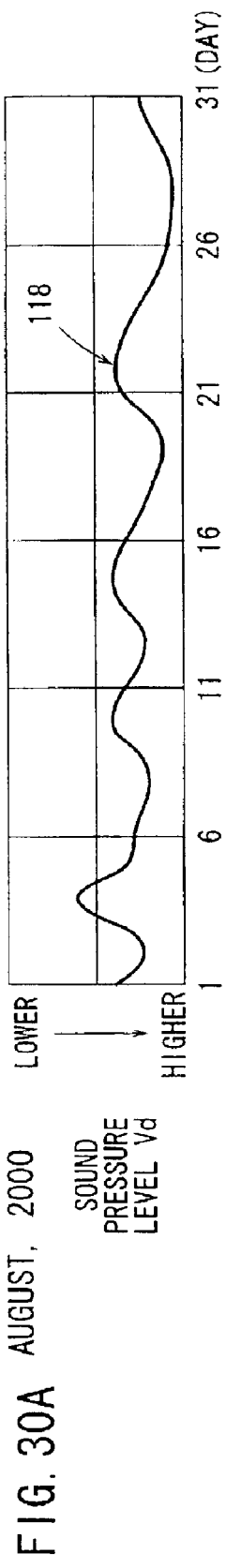
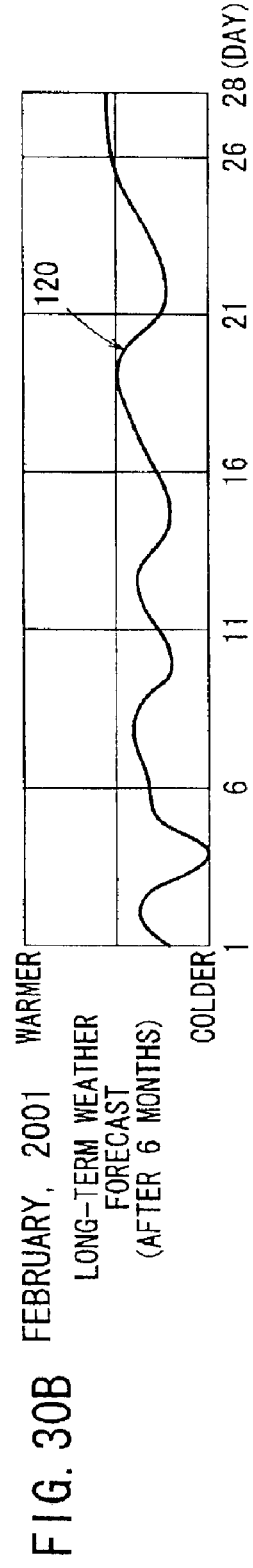
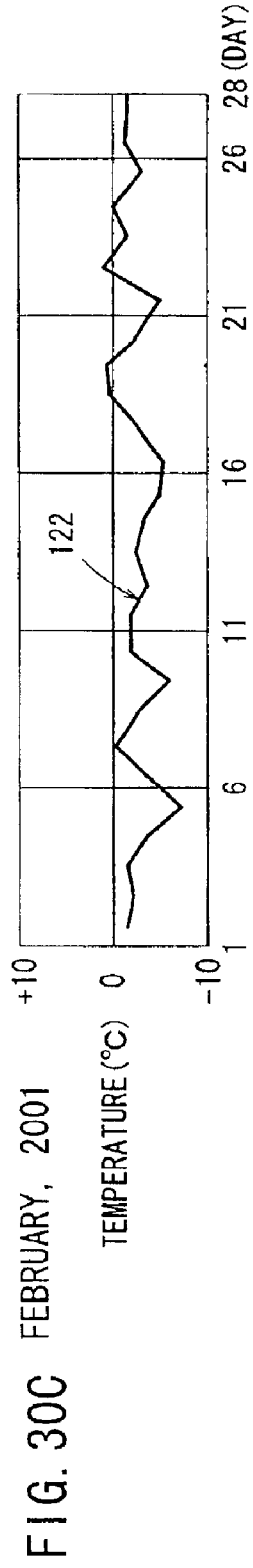

SYSTEM FOR WATCHING AND FORECASTING CHANGES IN NATURAL PHENOMENA AND WEATHER BASED ON SOUNDS FROM THE EARTH

BACKGROUND OF THE INVENTION

1. Field of the Invention

The present invention relates to a system for and a method of watching and forecasting long-term weather conditions based on sounds from the earth which are measured by a sensor, and also watching and forecasting changes in natural phenomena and changes in the weather to watch and forecast slope failures including landslides, debris avalanches, snow avalanches, etc.

2. Description of the Related Art

Heretofore, human and property losses resulting from slope failures such as landslides or the like which are abnormal natural phenomena have caused critical damages to regional economies.

If slope failures can be forecast, then it is possible to minimize human and property losses caused thereby, resulting in large economic advantages.

Therefore, there have been steady demands for systems to predict slope failures such as landslides or the like and evacuate local people from the hazardous area quickly.

It is desirable to predict long-term weather changes over more than one month in order to avoid the danger of natural disasters such as slope failures, make agricultural activities efficient, and allow various events to be scheduled easily.

Heretofore, a correlating process, a periodic process, and an analogous process have been employed to predict long-term changes in the weather over more than one month, i.e., long-term changes in atmospheric conditions and various atmospheric phenomena including snow, rain, wind, thunder, etc.

These predicting processes forecast long-term weather changes according to a statistic approach based on empirical rules that are created because physical laws about the weather are not clear enough, unlike short-term weather forecasting processes for predicting weather changes over about one week, which are characterized by the use of highly sophisticated meteorological observation devices, a large number of meteorological observation sites, and a large number of meteorological observation cycles. The long-term weather forecasting processes predict long-term weather changes based on an average of predicted data over a plurality of years in the past, e.g., over several decades. The prediction data produced by these long-term weather forecasting processes are not necessarily highly accurate, although these processes are capable of roughly predicting long-term weather changes. It is almost impossible for the long-term weather forecasting processes to predict accurately whether it will be hot or cold on a particular day in the future, e.g., after 3 months or 6 months from now.

There are two known techniques to watch a landslide. According to the first technique, an Invar wire is extended under tension between two points, and the distance between the points is measured from an elongation of the Invar wire. According to the second technique, a water pressure meter is placed in a hole formed in the ground by boring, and a pressure transmitted by a fluid present in a pore in the soil or rock, i.e., a so-called pore water pressure is measured.

The first technique which employs an Invar wire suffers a fatal defect in that it is unable to detect a slope failure which occurs in a position away from the two points. One solution is to use a number of Invar wires installed in different positions. However, land areas which are used for agricultural activities limit the number of locations available for installing Invar wires because Invar wires would lower the efficiency of agricultural activities. The cost of a system for measuring changes in the distances between points where many Invar wires are installed is considerably large.

The second technique which employs a water pressure meter placed in a hole formed in the ground is disadvantageous in that it is highly expensive and it is impossible to perform boring on all dangerous land regions. Another problem of the second technique is that available experimental data are definitely not enough for identifying a direct causal relation between a change in the pore water pressure and a slope failure. In addition, the second technique cannot meet a quick need for landslide monitoring because it usually takes several days to form a hole in the ground by boring.

Consequently, there is not any satisfactory process for locally and accurately predicting a slope failure.

SUMMARY OF THE INVENTION

The applicant of the present application has proposed a new weather forecasting system for observing sounds from the earth using trees or the like and predicting highly accurately short-term weather conditions within 48 hours or the like based on changes in the observed sounds, as disclosed in U.S. patent application Ser. No. 09/718,491.

It is an object of the present invention to provide an apparatus for and a method of watching and forecasting long-term weather conditions to produce long-term and accurate weather forecasts.

Another object of the present invention to provide an apparatus for watching and forecasting a slope failure such as a landslide or the like with a simple arrangement, a system thereof, a method of forecasting a slope failure, and a system for watching a slope failure.

According to the present invention, there is provided an apparatus for forecasting long-term weather conditions, comprising means for measuring sounds from the earth, and forecasting means for forecasting long-term weather conditions based on a change in the measured sounds from the earth. With this arrangement, long-term weather conditions in the future can be forecast based on changes in the sounds from the earth.

The forecasting means comprises means for forecasting long-term weather conditions of a day three or six months after the sounds from the earth are measured. It is also possible to forecast weather conditions nine or twelve months, which are multiples of three months, after the time when the sounds from the earth are measured. Specifically, the forecasting means forecasts temperatures of a corresponding day of the month three months after a day when the sounds from the earth are measured, and the forecasting means forecasts that the temperature on or around the corresponding day will be lower than a past average temperature of the month if the sounds from the earth is relatively large, and forecasts that the temperature on or around the corresponding day will be higher than the past average temperature of the month if the magnitude of the sounds from the earth is relatively small.

Further, the forecasting means forecasts temperatures of a corresponding day of the month six months after a day when the sounds from the earth are measured, and the forecasting means forecasts that the temperature on or around the corresponding day will be higher than a past average temperature of the month if the sounds from the earth is relatively large, and forecasts that the temperature on or around the corresponding day will be lower than the past average temperature of the month if the magnitude of the sounds from the earth is relatively small.

The magnitude of the sounds from the earth comprises an average of the magnitudes of the sounds from the earth such as a moving average of the magnitudes of the sounds from the earth.

Therefore, according to the present invention, it is possible to make a long-term weather forecast after three or six months and also obtain an accurate long-term weather forecast.

According to the present invention, there is also provided a method of forecasting long-term weather conditions, comprising the steps of measuring sounds from the earth, and forecasting long-term weather conditions based on a change in the measured sounds from the earth. The method makes it possible to forecast accurate long-term weather conditions.

According to the present invention, there is further provided an apparatus for forecasting a slope failure, comprising means for measuring sounds from the earth, and forecasting means for forecasting a slope failure based on a change in the measured sounds from the earth. The apparatus makes it possible to forecast a slope failure based on a change in the measured sounds from the earth.

The sounds from the earth can be measured through a tree on the earth. Therefore, a slope failure can be forecast with a simple arrangement. The sounds from the earth may be measured through a stake driven in the ground rather than a tree on the earth.

The forecasting means may comprise means for forecasting a slope failure when the means for measuring sounds from the earth measures a sound from the earth having a frequency ranging from 30 to 200 Hz.

The forecasting means may comprise means for presuming a sound produced by a rupture of a root of the tree when the means for measuring sounds from the earth measures a sound from the earth having a frequency ranging from 100 to 160 Hz, and presuming a sound produced by a land movement when the means for measuring sounds from the earth measures a sound from the earth having a frequency ranging from 30 to 50 Hz.

The forecasting means may comprise means for presuming a sound produced by an underground water flow when the means for measuring sounds from the earth measures a sound from the earth continuously.

The apparatus may further comprise means for, when the means for measuring sounds from the earth measures the sounds from the earth simultaneously in at least four sites, calculating a position in which the sounds from the earth are produced, based on a simultaneous observation of the sounds from the earth in the at least four sites.

According to the present invention, there is also provided a system for forecasting a slope failure, comprising means for measuring sounds from the earth, means for capturing a ground surface image, and means for forecasting a slope failure based on a change in the measured sounds from the earth and a change in the captured ground surface image.

With the above arrangement, it is possible to forecast a slope failure based on a change in the measured sounds from the earth and a change in the captured ground surface image. Therefore, a slope failure can be predicted highly accurately.

The means for measuring sounds from the earth comprises means for measuring sounds from the earth through a tree on the earth, and the means for forecasting a slope failure comprises means for capturing images chronologically and detecting a change in the ground surface image based on a difference between the chronologically captured images.

The means for forecasting a slope failure comprises means for forecasting a slope failure when the means for measuring sounds from the earth measures a sound from the earth having a frequency ranging from 30 to 200 Hz and the means for capturing a ground surface image detects a change in the captured ground surface image.

According to the present invention, there is further provided a method of forecasting a natural phenomenon, comprising the steps of measuring sounds from the earth, and forecasting a change in the natural phenomenon based on a change in the measured sounds from the earth. The method makes it possible to forecast a change in the natural phenomenon based on a change in the measured sounds from the earth.

According to the present invention, there is further provided a method of forecasting a slope failure, comprising the steps of measuring sounds from the earth, and forecasting a slope failure based on a change in the measured sounds from the earth.

According to the present invention, there is also provided a method of forecasting a slope failure, comprising the steps of measuring sounds from the earth, capturing a ground surface image, and forecasting a slope failure based on a change in the measured sounds from the earth and a change in the captured ground surface image. It is possible with the method to forecast a slope failure with high accuracy.

According to the present invention, there is also provided a system for watching a slope failure, comprising means for measuring sounds from the earth, means for capturing a ground surface image, and means for watching a slope failure based on a change in the measured sounds from the earth and a change in the captured ground surface image. The system makes it possible to watch a slope failure.

The above and other objects, features, and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 25 is a map showing a location where sounds were measured and a location where temperatures were observed;

FIGS. 26A through 26D are diagrams illustrative of a process of forecasting long-term weather conditions based on sounds from the earth, FIG. 26A showing average measured values of pressure sound levels obtained from sounds, FIG. 26B showing a curve approximating the average measured values shown in FIG. 26A, FIG. 26C showing a weather forecasting curve after 3 months, and FIG. 26D showing a weather forecasting curve after 6 months;

FIG. 27A is a diagram showing a curve of sounds from the earth measured in August, 2000;

FIG. 27B is a diagram showing a weather forecasting curve for November, 2000 which is 3 months after August, 2000;

FIG. 27C is a diagram showing a curve of temperatures measured in November, 2000;

FIG. 28A is a diagram showing a curve of sounds from the earth measured in September, 2000;

FIG. 28B is a diagram showing a weather forecasting curve for December, 2000 which is 3 months after September, 2000;

FIG. 28C is a diagram showing a curve of temperatures measured in December, 2000;

FIG. 29A is a diagram showing a curve of sounds from the earth measured in October, 2000;

FIG. 29B is a diagram showing a weather forecasting curve for January, 2001 which is 3 months after October, 2000;

FIG. 29C is a diagram showing a curve of temperatures measured in January, 2001;

FIG. 30A is a diagram showing a curve of sounds from the earth measured in August, 2000;

FIG. 30B is a diagram showing a weather forecasting curve for February, 2001 which is 6 months after August, 2000;

FIG. 30C is a diagram showing a curve of temperatures measured in February, 2001;

DESCRIPTION OF THE PREFERRED EMBODIMENTS

Figure 1:
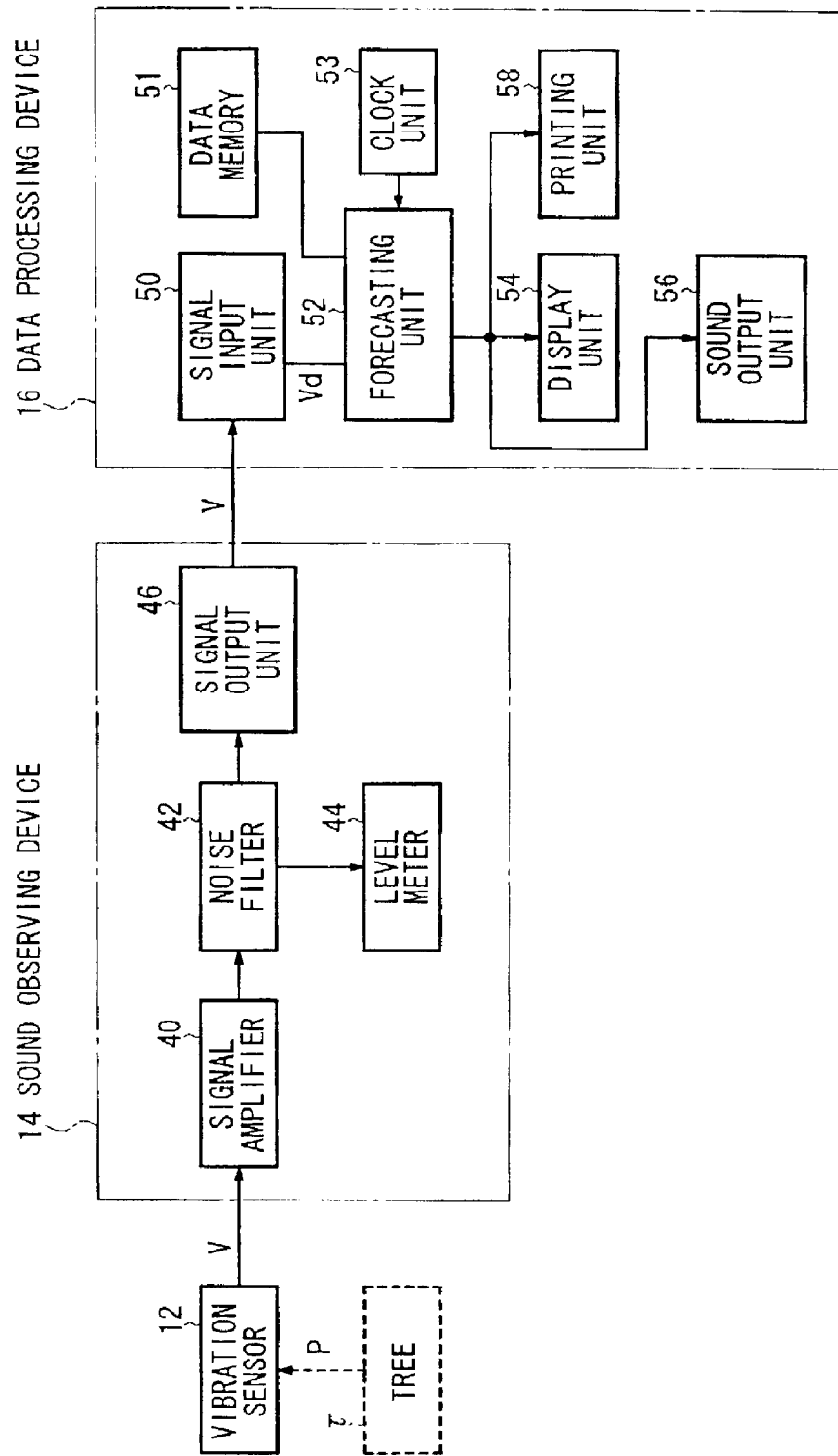
FIG. 1 is a block diagram of a slope failure forecasting apparatus according to a first embodiment of the present invention.

1st Embodiment: Slope Failure Forecasting Apparatus:

FIG. 1 shows a forecasting apparatus 10 for use as a slope failure forecasting apparatus according to a first embodiment of the present invention and also as a long-term weather forecasting apparatus according to a third embodiment of the present invention as described later on.

The forecasting apparatus 10 serves as an apparatus for forecasting slope failures including landslides, debris avalanches, snow avalanches, etc. As shown in FIG. 1, the forecasting apparatus 10 comprises a vibration sensor 12 as a sound measuring means, a sound observing device 14, and a data processing device 16.

Figure 2:
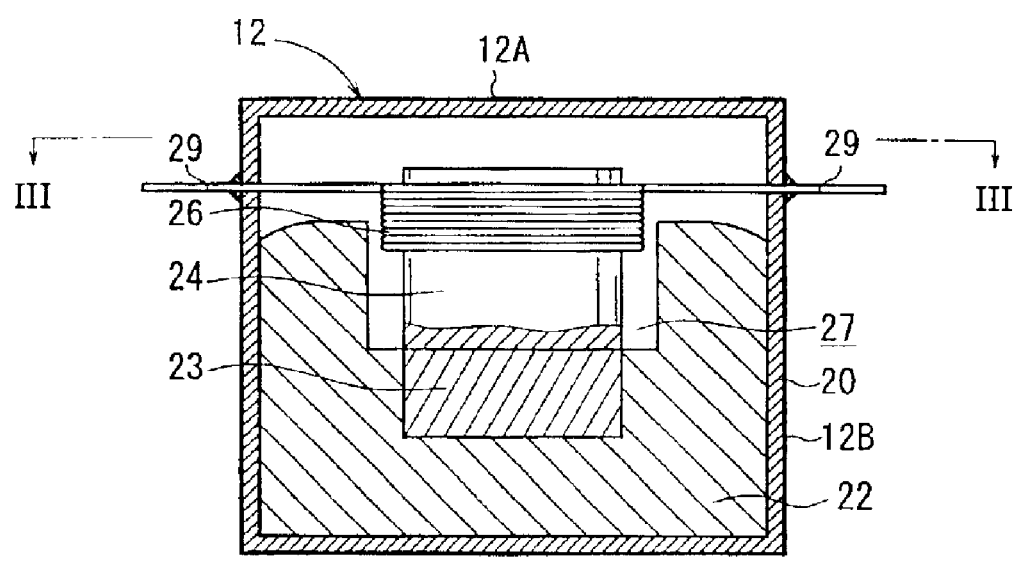
FIG. 2 is a cross-sectional view of a vibration sensor of the slope failure forecasting apparatus shown in FIG. 1.
Figure 3:
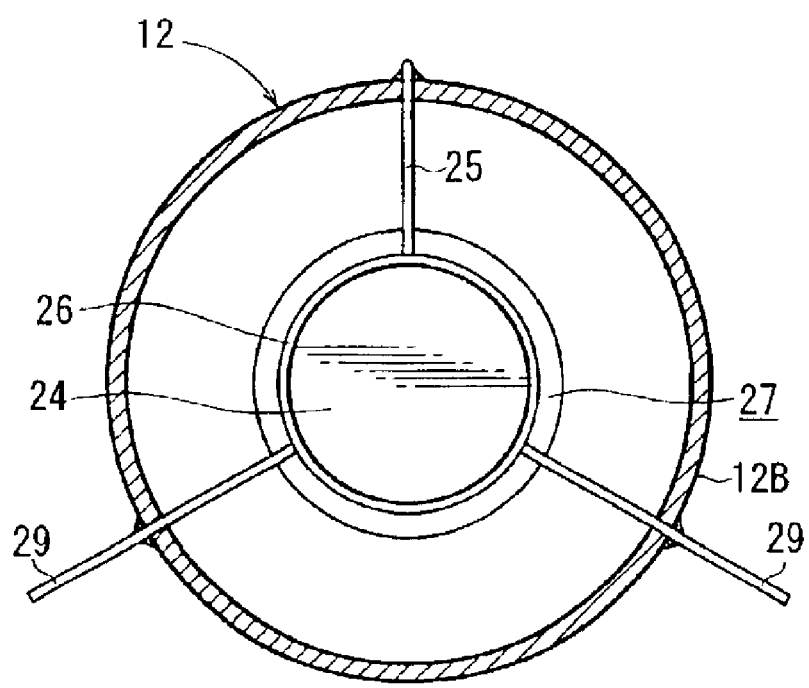
FIG. 3 is a cross-sectional view taken along line III—III of FIG. 2.

FIG. 2 shows in cross section the vibration sensor 12, and FIG. 3 shows in cross section the vibration sensor 12 taken along line III—III of FIG. 2. The vibration sensor 12 is in the form of a moving-coil microphone.

As shown in FIGS. 2 and 3, the vibration sensor 12 has a closed cylindrical casing 20 housing therein a magnetizable member body 22 of a concave cross section which has a recess in which a columnar permanent magnet 23 and a magnetizable member 24 are fixedly mounted in a layered structure. The recess in the magnetizable member 22 is open toward an upper surface 12A of the casing 20.

The magnetizable member 24 and the magnetizable member 22 have respective upper surfaces lying substantially flush with each other.

A resilient wire is wound around the magnetizable member 24 and functions as a coil (moving coil) 26. Damper wires 25 which are of the same filamentary material as leads 29 at output ends of the moving coil 26 are fixed to the side of the casing 20 at angular intervals of 120°. The moving coil 26 is supported on the side of the casing 20 with three wires, i.e., two of the leads 29 and one of the damper wires 25.

The moving coil 26 is movable (vertically in FIG. 2) around the magnetizable member 24, i.e., a cylindrical groove 27 defined between the magnetic bodies 22, 24.

The vibration sensor 12 thus constructed serves to collect solid object vibration sounds transmitted through a tree τ (see FIG. 4) on the earth. The vibration sensor 12 is held in contact with a solid object which vibrates as a source of sounds to be collected, i.e., the trunk of the tree τ. When the tree τ vibrates, the casing 20 of the vibration sensor 12 is vibrated. When the casing 20 is vibrated, the permanent magnet 23 is vibrated, and the magnetic field generated thereby is also vibrated. Since the vibration plate 25 and the moving coil 26 tend to stop due to inertia, the permanent magnet 23 and the moving coil 26 vibrate relatively to each other, changing interlinking magnetic fluxes therebetween. As a result, a signal voltage V is developed by the moving coil 26.

The vibration sensor 12 thus constructed is able to detect vibrations in a frequency range from 25 Hz to 600 Hz as a sound pressure. The frequency range in which the vibration sensor 12 can detect vibrations can be changed by changing the area of the recesses 25B, the size of the moving coil 26, or the size of the vibration sensor 12 itself.

The signal voltage V developed by the moving coil 26 is supplied via leads 29 connected to the moving coil 26 to a signal amplifier 40 (see FIG. 1) in the sound observing device 14.

Figure 4:
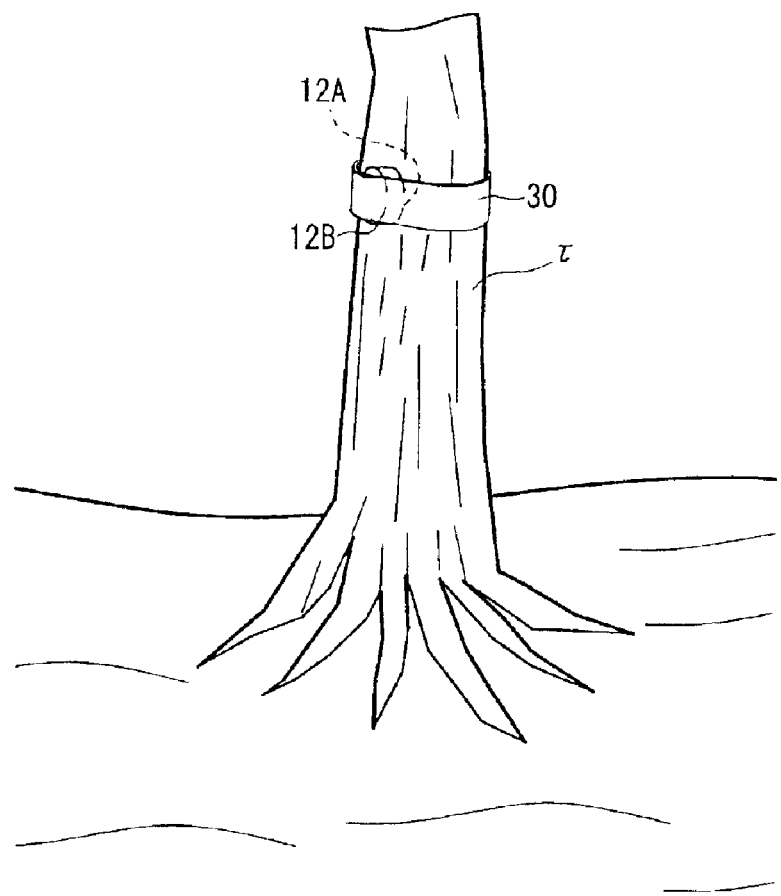
FIG. 4 is a fragmentary perspective view of a tree on which the vibration sensor shown in FIGS. 2 and 3 is mounted.

FIG. 4 shows the vibration sensor 40 mounted on the trunk of the tree τ. The vibration sensor 40 may alternatively be mounted on a branch of the tree τ. Specifically, the vibration sensor 40 is mounted on the tree τ by a belt 30 with the upper surface 12A (see FIG. 2) thereof held closely against the surface of the trunk of the tree τ. Alternatively, the vibration sensor 40 may be mounted on the tree τ with a side surface 12B (see FIG. 2) thereof held closely against the surface of the trunk of the tree τ.

The vibration sensor 40 should preferably be mounted on the tree τ at such a height that the sound pressure of sounds P (see FIG. 1) from the earth applied thereto is relatively high when the vibration sensor 40 is vertically vibrated on the trunk of the tree τ.

The sounds P from the earth transmitted to the roots of the tree τ to the trunk thereof are detected by the vibration sensor 12, which outputs the signal voltage V depending on the detected sounds P. The signal voltage V is then transmitted from the vibration sensor 12 to the sound observing device 14. As described above, sounds observed as the sounds P from the earth include wind sounds and sounds produced when solid objects such as stones roll on the ground, in addition to sounds from the earth.

As shown in FIG. 1, the sound observing device 14 comprises the signal amplifier 40, a noise filter 42, a level meter 44, and a signal output unit 46. The signal amplifier 40 may comprise a differential amplifier for reducing the effect of noise on the signal voltage V.

When the signal amplifier 40 is supplied with the signal voltage V from the vibration sensor 12, the signal amplifier 40 amplifies the signal voltage V by $10^4$ times, for example, and outputs the amplified signal voltage to the noise filter 42.

The noise filter 42 removes noise from the signal voltage V from the signal amplifier 40, and supplies the signal voltage V to the signal output unit 46. Since the sounds P from the earth are present mainly in a frequency band of 1 kHz or lower, the noise filter 42 comprises a low-pass filter (LPF) or a bandpass filter (BPF) (preferably a BPF having a pass band ranging from 20 Hz to 650 Hz which covers the frequency range from 25 Hz to 600 Hz of the vibration sensor 12) for passing signal components in that frequency band.

The signal voltage V from which noise is removed by the noise filter 42 is also supplied to the level meter 44, which indicates the level of the signal voltage V. Therefore, the user of the forecasting apparatus 10 can confirm the magnitude of the sounds P from the earth based on the indication on the level meter 44. The user may determine the height (the vertical position where the sound pressure of the sounds P is relatively high) at which the vibrator sensor 12 is to be mounted on the tree τ based on the magnitude of the sounds P from the earth as recognized from the indication on the level meter 44.

The signal output unit 46 outputs the signal voltage V supplied from the noise filter 42 to the data processing device 16.

The data processing device 16 has a signal input unit 50, a data memory 51, a forecasting unit (slope failure forecasting means, long-term weather forecasting means) 52, a clock unit 53, a display unit 54, a sound output unit 56, and a printing unit 58. Actually, the data processing device 16 comprises a personal computer constructed of a keyboard, a main body, a display unit, a sound output unit, and an external memory such as a hard disk or the like, and the forecasting unit 52 essentially comprises a CPU (Central Processing Unit) (including peripherals) in the main body. The data memory 51 and the clock unit 53 may be incorporated in the forecasting unit 52.

The data processing device 16 includes a ROM (Read Only Memory) for storing a system program and application programs, a RAM (Random Access Memory) for use as a working memory, a timer for measuring time, which is provided by the clock unit 53 having calendar and clock functions, input and output interfaces such as an A/D converter, a D/A converter, etc., a waveform observing board as a waveform observation signal reading and sending unit for displaying the sound pressure of the sounds P from the earth along the vertical axis with time along the horizontal axis on the display unit 54, and a frequency analyzing board (FFT board) as a frequency analyzing and sending unit for displaying the sound pressure along the vertical axis with frequencies along the horizontal axis on the display unit 54.

The signal input unit 50 reads the signal voltage V from the signal output unit 46 of the sound observing device 14 at suitable time intervals (e.g., intervals of 1 minute or 10 minutes). The signal input unit 50 converts the signal voltage V into a digital signal, and supplies the digital signal as a sound pressure level Vd corresponding to the sound pressure of the sounds P to the forecasting unit 52. The signal input unit 50 may alternatively read the signal voltage V based on a command from the forecasting unit 52.

The forecasting unit 52 performs a process of forecasting a slope failure based on the sound pressure level Vd from the signal input unit 50.

The result of the forecasting process performed by the forecasting unit 52 is supplied to the display unit 54, which may comprise a CRT, a liquid crystal display panel, or the like, and also to the printing unit 58 such as a printer or the like. The result of the forecasting process is also supplied to the sound output unit 56, which may comprise a speaker or the like.

Figure 5:
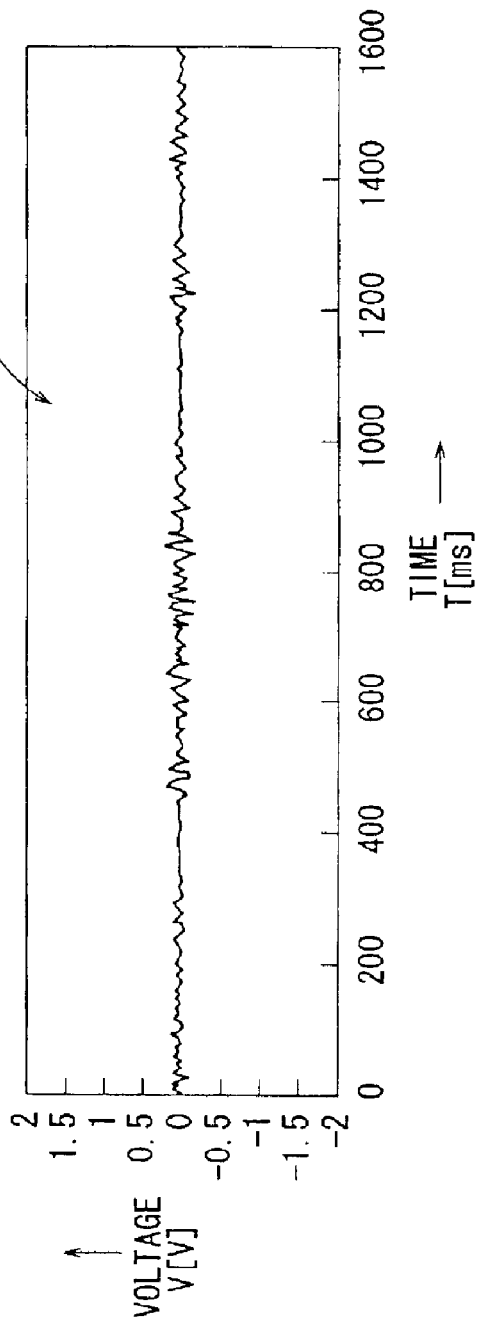
FIG. 5 is a diagram showing the waveform of a presumed noise sound.

FIG. 5 shows the waveform, displayed on the display unit 54, of a sound P1 which is considered to be noise, produced by the waveform observing board in the data processing device 16 (hereinafter referred to as "presumed noise sound"). In FIG. 5, the horizontal axis represents time T in the unit [ms] and the vertical axis voltages V in the unit [V]. The voltage V is of a relative value.

The waveform of the presumed noise sound P1, etc. can be stored in the memory such as the hard disk or the like in the data processing device 16 at processing time intervals based on a program or at desired times using the keyboard or the like (not shown).

Figure 6:
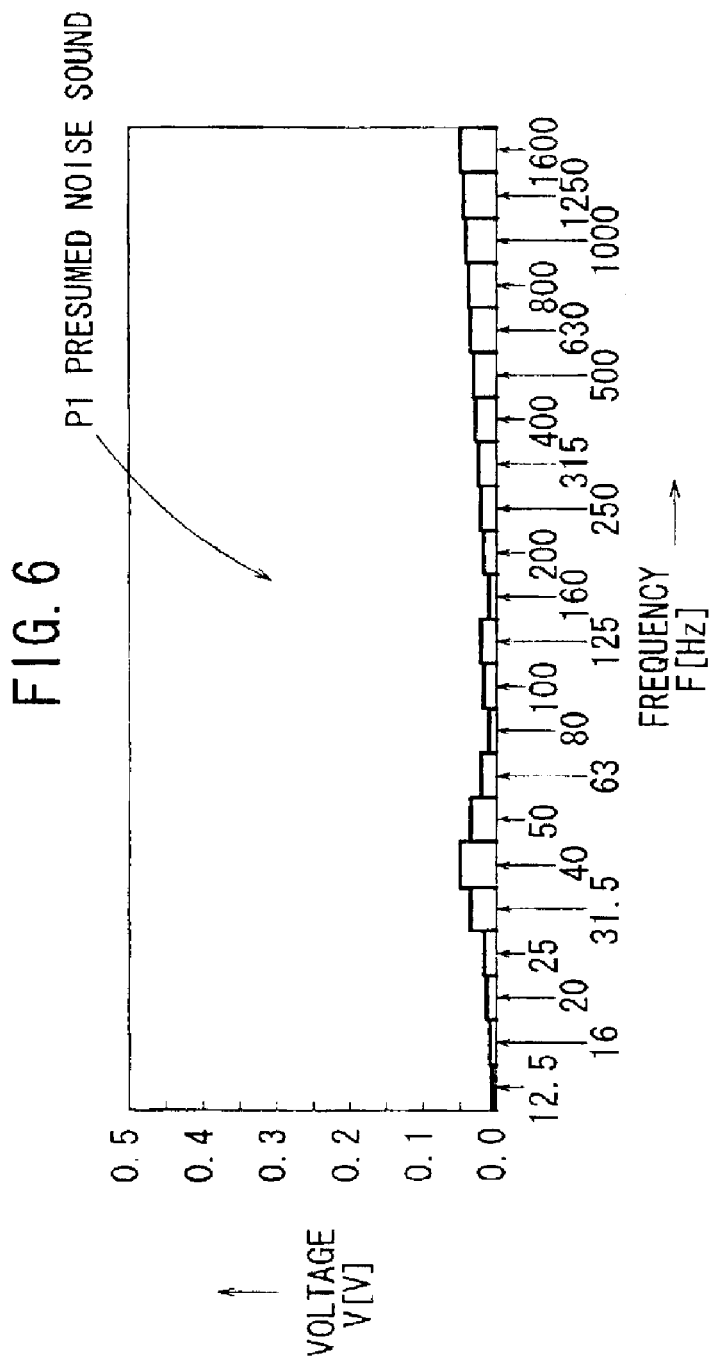
FIG. 6 is a diagram showing a frequency distribution of the presumed noise sound.

FIG. 6 shows the frequency spectrum (frequency distribution) of the presumed noise sound P1 displayed on the display unit 54, produced by the waveform observing board in the data processing device 16. In FIG. 6, the horizontal axis represents frequencies F in the unit [Hz] and the vertical axis voltages V in the unit [V].

Figure 7:
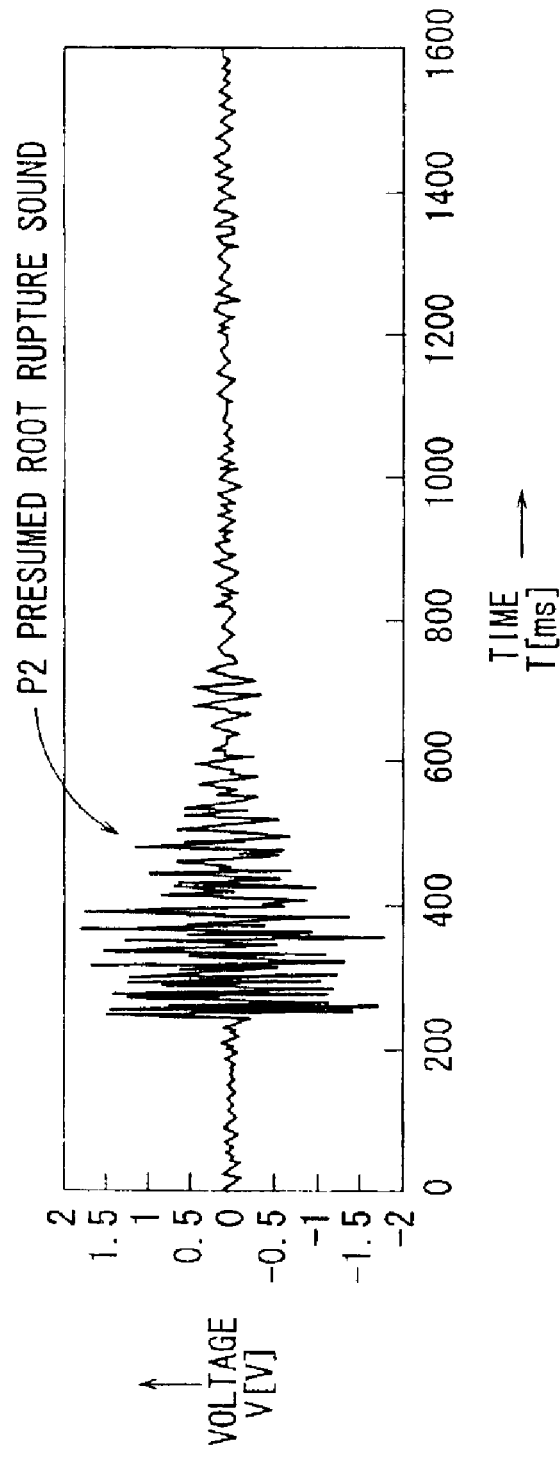
FIG. 7 is a diagram showing the waveform of a presumed root rupture sound.

FIG. 7 shows the waveform of a sound P2 which is considered to be a sound produced upon the rupture of a root of the tree τ (which is not limited to the tree τ on which the vibration sensor 12 is mounted) (hereinafter referred to as "presumed root rupture sound").

Figure 8:
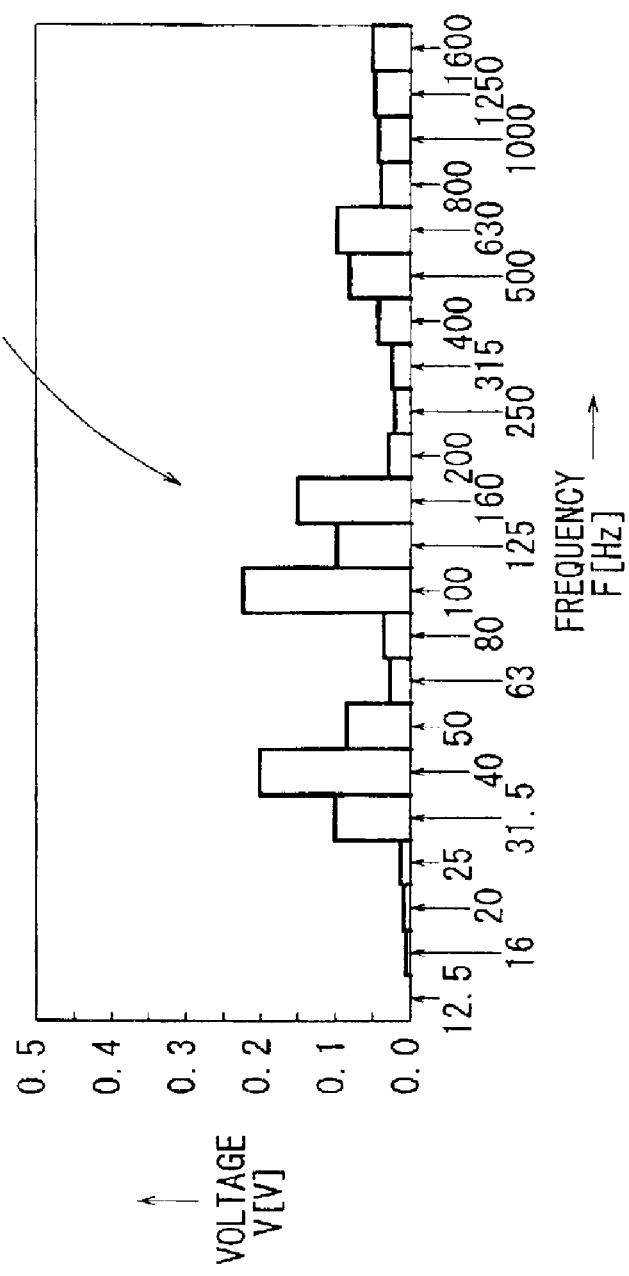
FIG. 8 is a diagram showing a frequency distribution of the presumed root rupture sound.

FIG. 8 shows the frequency spectrum of the presumed root rupture sound P2.

The presumed root rupture sound P2 from the sound output unit 56 has an amplitude of ±2 [V] or less on the waveform, and contains pulsed amplitude peaks occurring at intervals of about 0.2 seconds. The intervals of the pulsed amplitude peaks are considered to change depending on the thickness of the root which is ruptured.

The frequency distribution shown in FIG. 8 indicates a large spectrum in a frequency band from 100 to 160 Hz, and the presumed root rupture sound P2 is confirmed in this frequency band. In a frequency band from 30 to 60 Hz, a spectrum having values in the range from 0.1 to 0.2 [V] is recognized even after the presumed noise sound P1 is removed.

The values of the voltage V in the frequency distribution are lower than the amplitudes of the voltage V displayed in the waveform because of an error due to the processing time upon the FFT analysis. The relationship between the waveform and frequency distribution in each of the sounds to be described below also exhibits the same tendency.

Figure 9:
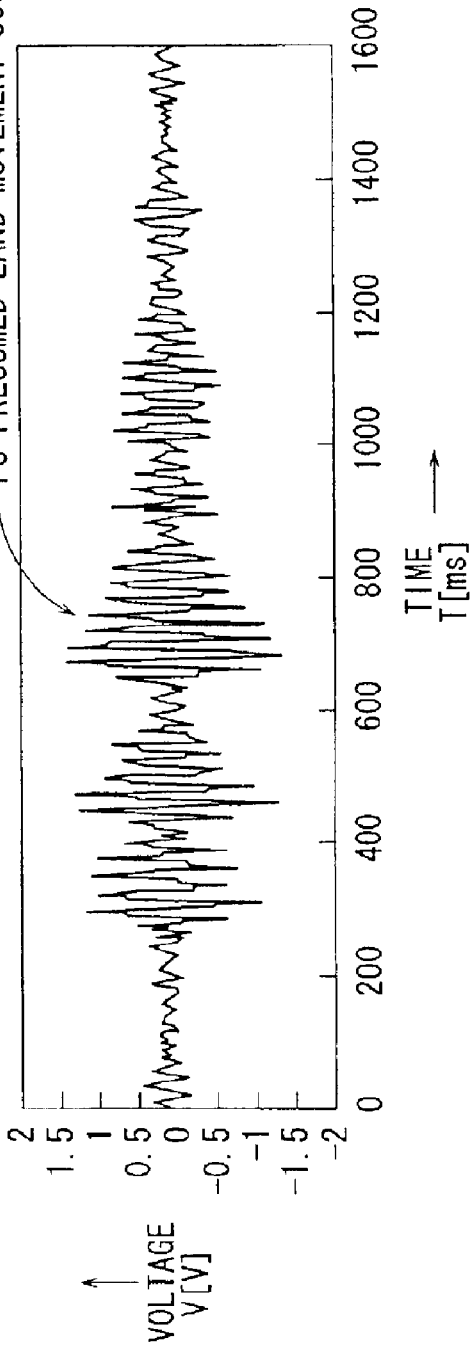
FIG. 9 is a diagram showing the waveform of a presumed land movement sound.

FIG. 9 shows the waveform of a sound P3 which is considered to be a sound produced when land moves (hereinafter referred to as "presumed land movement sound").

Figure 10:
FIG. 10 is a diagram showing a frequency distribution of the presumed land movement sound.

FIG. 10 shows the frequency spectrum of the presumed land movement sound P3.

The presumed land movement sound P3 from the sound output unit 56 has an amplitude of ±2 [V] or less on the waveform, and differs from the presumed root rupture sound P2 in that it is more elongated or has a longer tail than the presumed root rupture sound P2.

The frequency distribution of the presumed land movement sound P3 exhibits peaks in a frequency band from 30 to 60 Hz, and leaves a spectrum having values in the range from 0.3 to 0.5 [V] is recognized even after the presumed noise sound P1 is removed.

Figure 11:
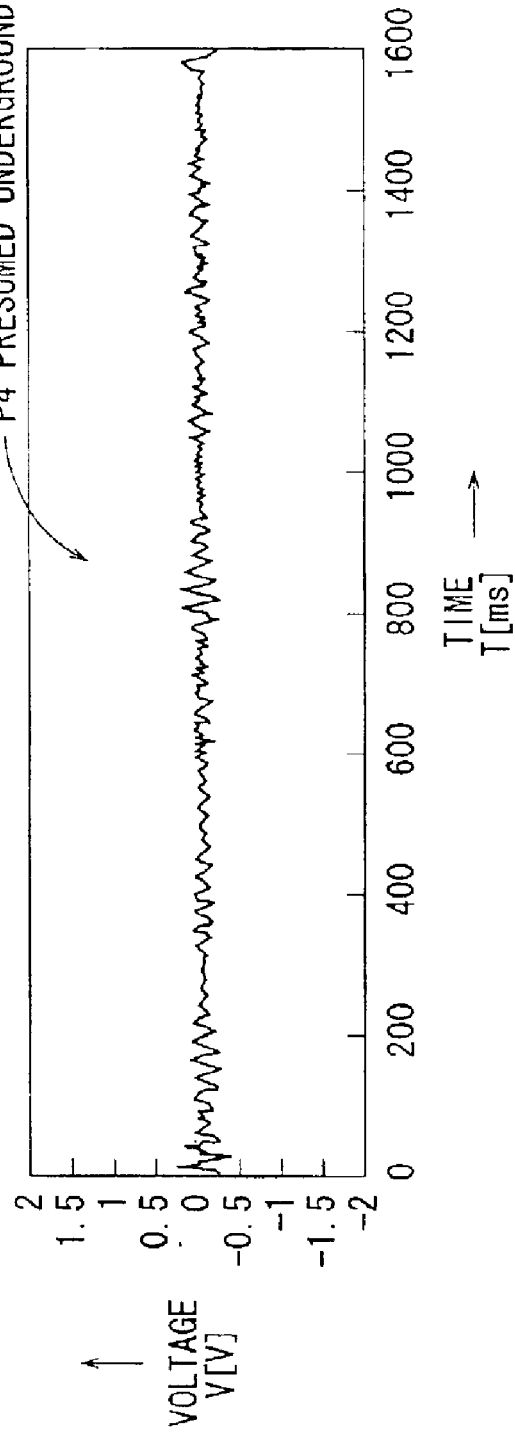
FIG. 11 is a diagram showing the waveform of a presumed underground water sound.

FIG. 11 shows the waveform of a sound P4 which is considered to be a sound produced when underground water flows (hereinafter referred to as "presumed underground water sound").

Figure 12:
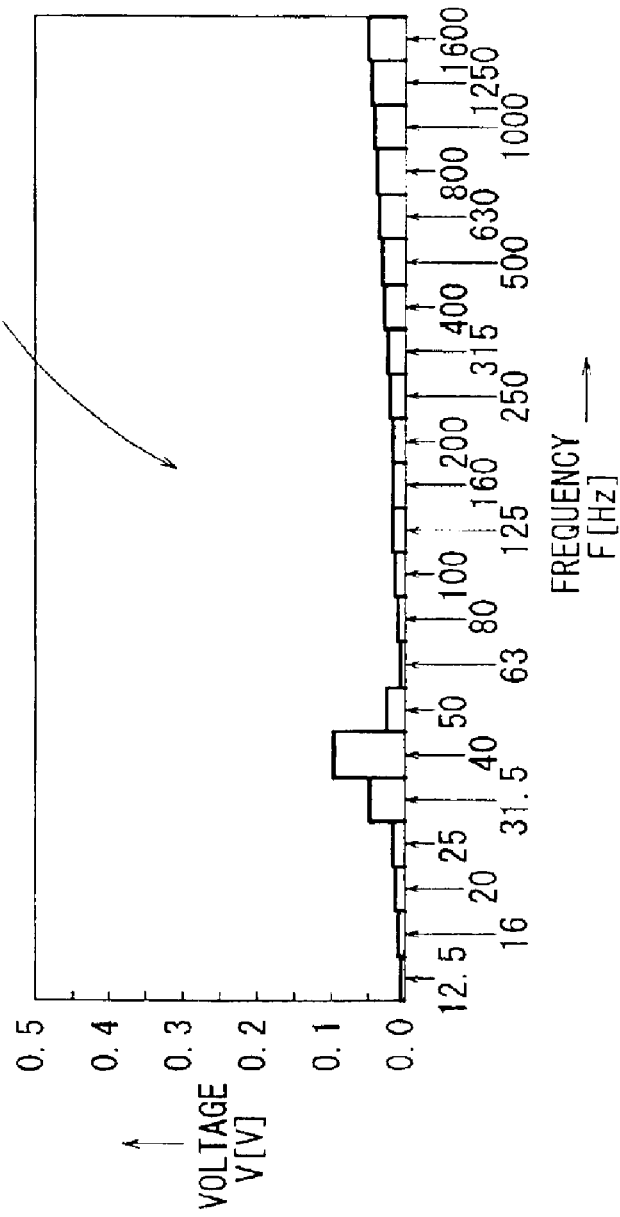
FIG. 12 is a diagram showing a frequency distribution of the presumed underground water sound.

FIG. 12 shows the frequency spectrum of the presumed underground water sound P4.

The presumed underground water sound P4 from the sound output unit 56 is of a small waveform amplitude value of about ±0.3 [V] or less, but differs from the presumed noise sound P1 in that it is repeated several times at intervals of about 0.1 second.

The frequency distribution of the presumed underground water sound P4 exhibits a large spectrum in a frequency band from 30 to 60 Hz, but is difficult to distinguish from the presumed noise sound P1.

Figure 13:
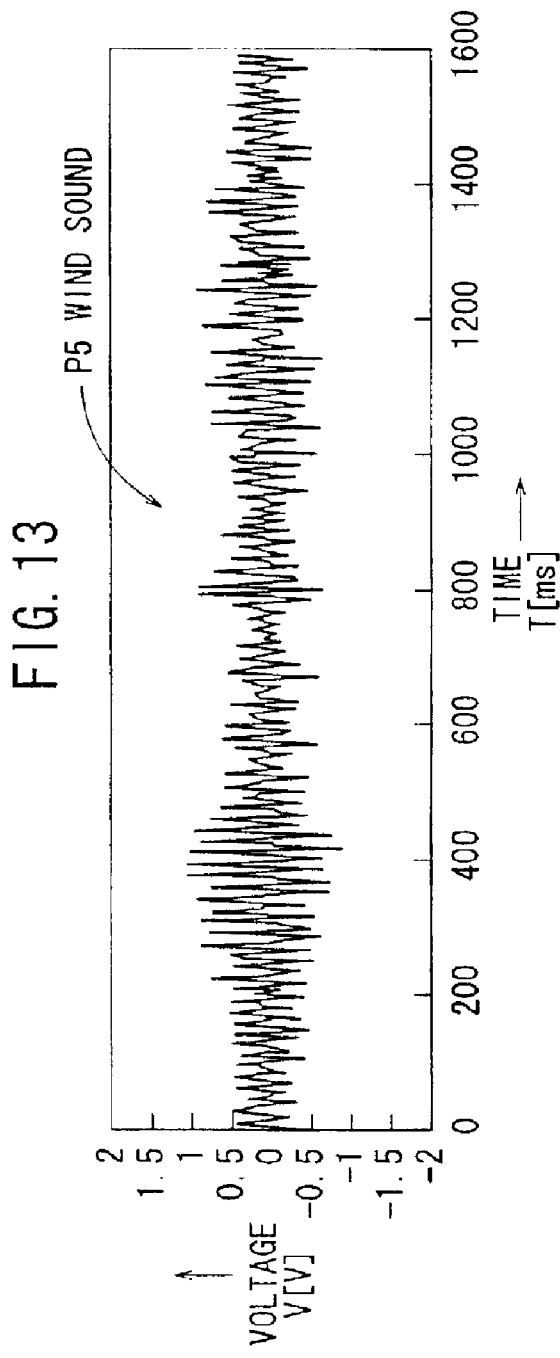
FIG. 13 is a diagram showing the waveform of a wind sound.

FIG. 13 shows the waveform of a sound P5 which is produced when a wind blows (hereinafter referred to as "wind sound"). The wind sound P5 is produced when the leaves of the tree τ rustle or human beings feel a wind, and can definitely be recognized as a wind sound rather than a presumed sound.

Figure 14:
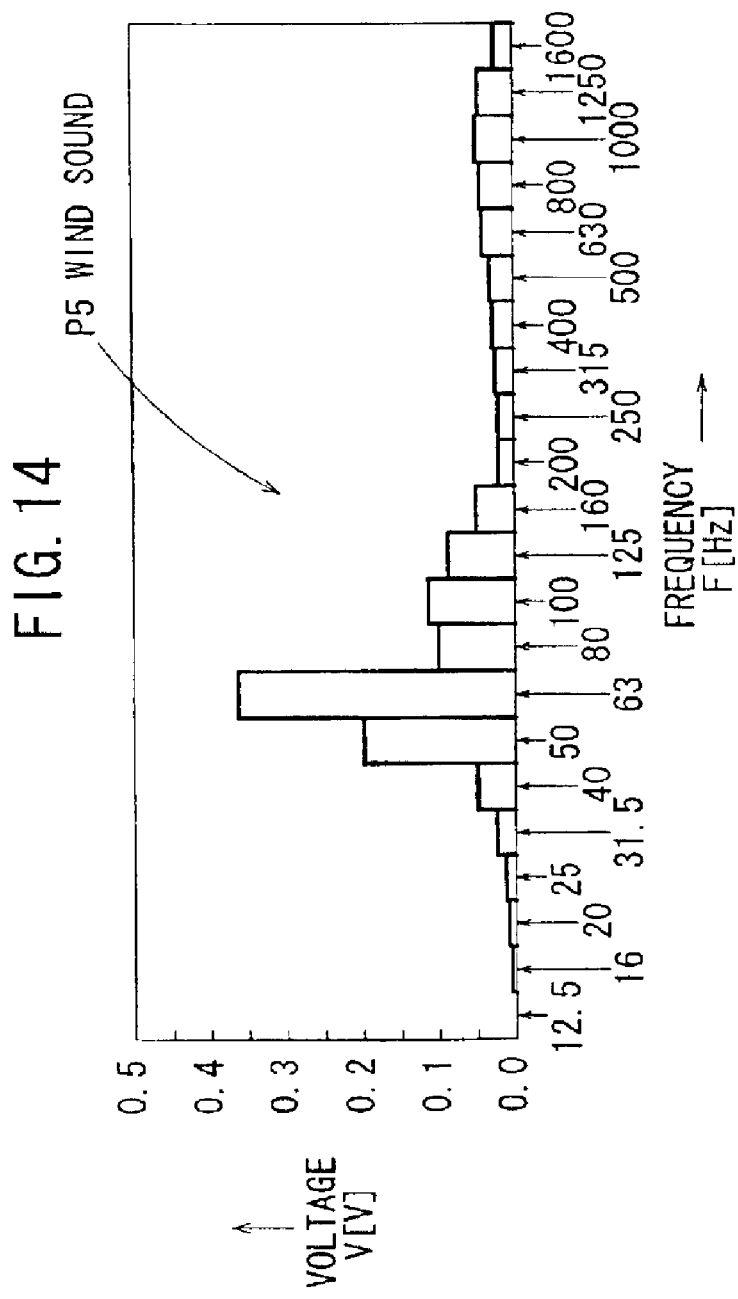
FIG. 14 is a diagram showing a frequency distribution of the presumed wind sound.

FIG. 14 shows the frequency spectrum of the wind sound P5.

The wind sound P5 from the signal output unit 56 has a waveform amplitude of ±1 [V] or less, and has substantially similar amplitudes repeated.

The frequency distribution of the wind sound P5 exhibits a spectrum in a wide frequency range from 30 to 180 Hz.

Figure 15:
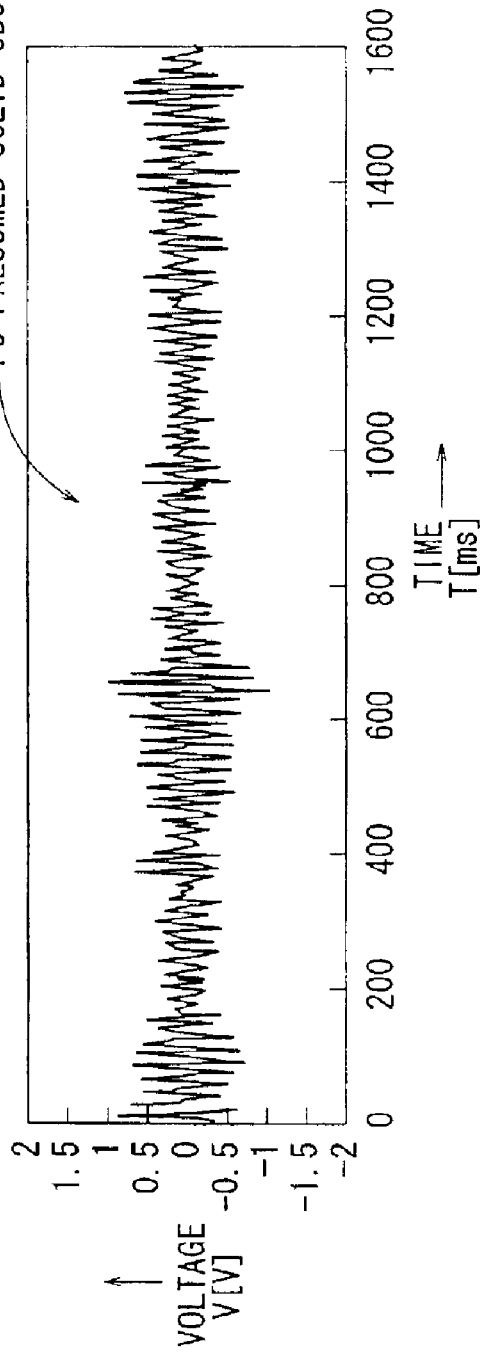
FIG. 15 is a diagram showing the waveform of a presumed solid object rolling sound.

FIG. 15 shows the waveform of a sound P6 which is considered to be a sound produced when a mass of soil or a stone rolls on the round when a wind is blowing (hereinafter referred to as "presumed solid object rolling sound"). The presumed solid object rolling sound P6 is difficult to distinguish from the wind sound P5 on the waveform.

Figure 16:
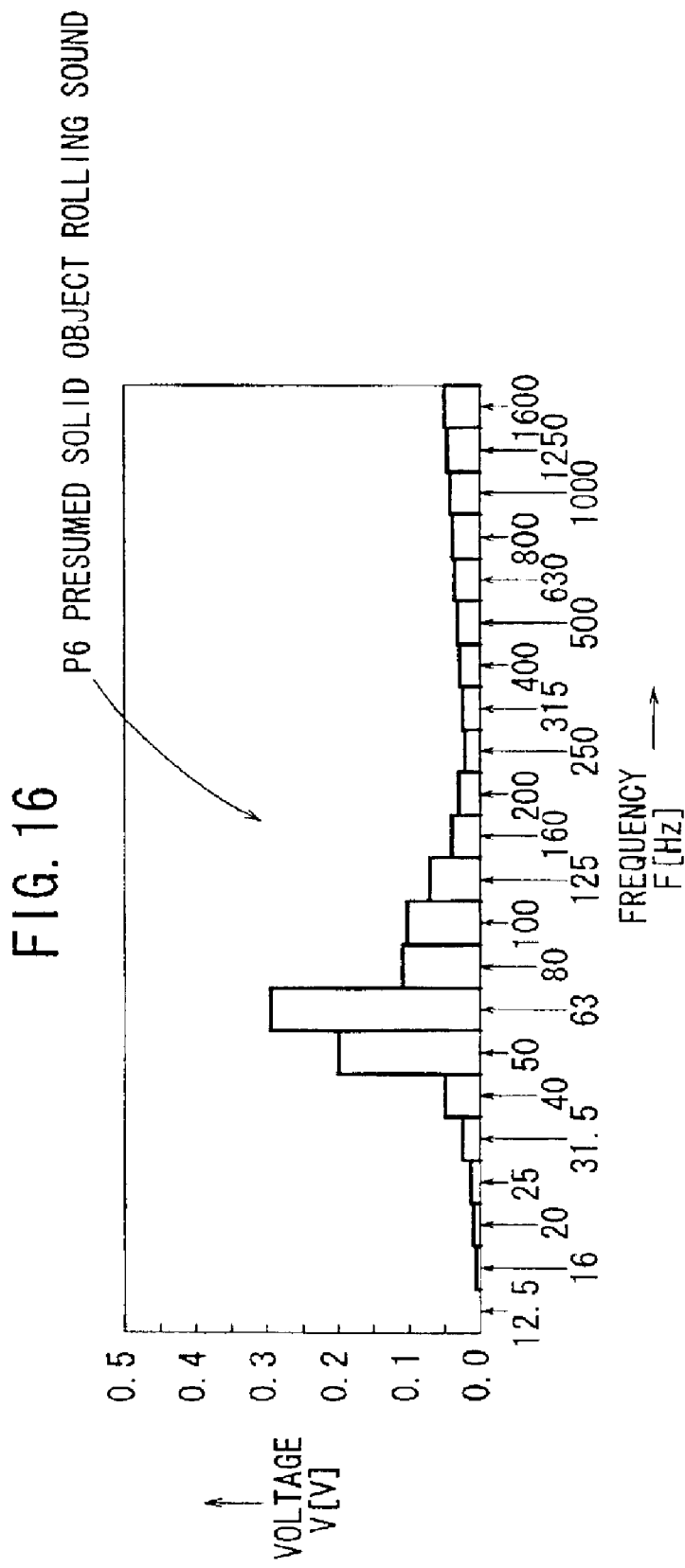
FIG. 16 is a diagram showing a frequency distribution of the presumed solid object rolling sound.

FIG. 16 shows the frequency spectrum of the presumed solid object rolling sound P6.

The presumed solid object rolling sound P6, which is generated simultaneously with the wind sound P5, from the sound output unit 56 has a waveform amplitude of ±1 [V] or less, and has substantially similar amplitudes repeated.

The frequency distribution of the presumed solid object rolling sound P6 exhibits peaks in a wide frequency range from 30 to 180 Hz. Though it is difficult to distinguish the presumed solid object rolling sound P6 and the wind sound P5 from each other on the waveform and the frequency distribution because they are observed simultaneously with each other, they can be distinguished from each other with the ear.

Figure 17:
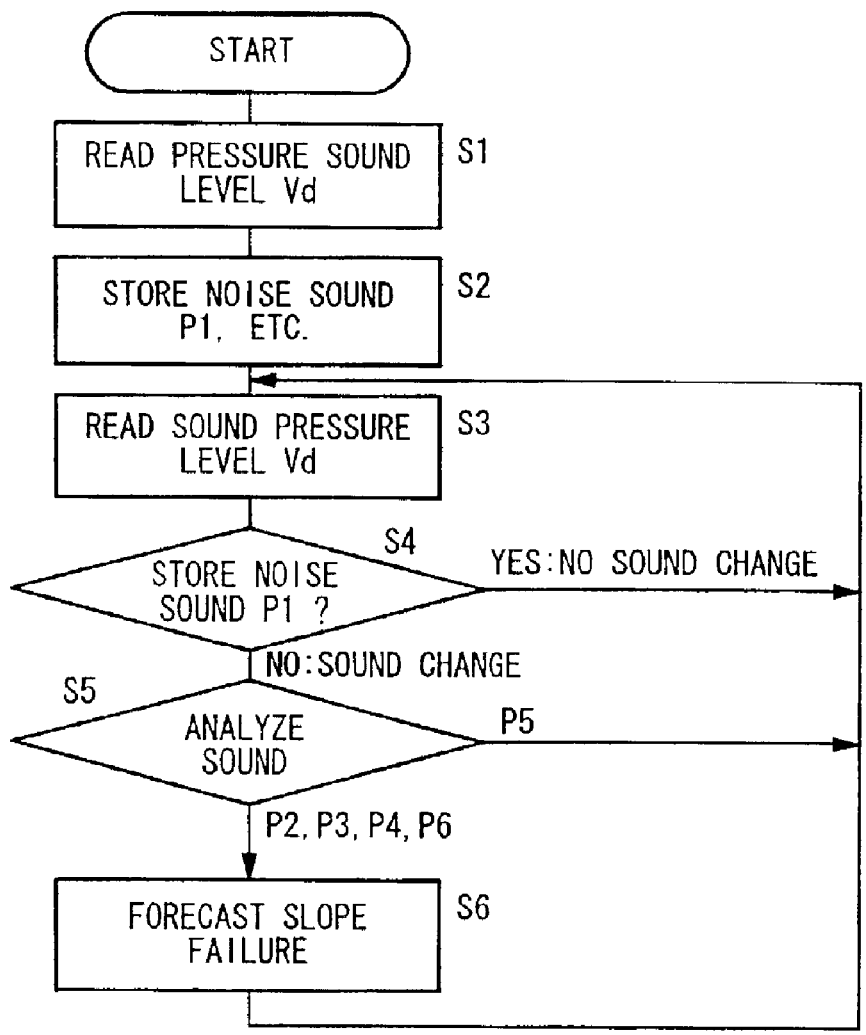
FIG. 17 is a flowchart of a forecasting process carried out by the slope failure forecasting apparatus shown in FIG. 1.

A slope failure forecasting process carried out by the forecasting unit 52 will be described below with reference to a flowchart shown in FIG. 17.

The forecasting unit 52 reads a pressure level Vd from the signal input unit 50 in step S1.

In step S2, the forecasting unit 52 stores the presumed noise sound P1 (waveform and frequency distribution) based on the sound pressure level Vd corresponding to noise in the memory. The presumed noise sound P1 can be confirmed from the waveform shown in FIG. 5, the frequency distribution shown in FIG. 6, and the sound from the sound output unit 56. In step S2, the waveforms and the frequency distributions of the sounds P2 through P6 are also stored in the memory.

In step S3, the forecasting unit 52 reads the sound pressure level V3 at given time intervals.

In step S4, the forecasting unit 52 compares the waveform or frequency distribution of the sound pressure level Vd read in step S3 with the waveform or frequency distribution of the presumed noise sound P1, and determines whether there is a sound change based on any difference between the waveforms or the frequency distributions.

If there is not a sound change greater than a certain level, then control returns to step S3.

If there is a sound change greater than a certain level, then the forecasting unit 52 analyzes the sound P by comparing it with the sounds P2 through P6 stored in the memory in step S5.

If the waveform and frequency distribution of the sound P represent the presumed root rupture sound P2, the presumed land movement sound P3, or the presumed underground water sound P4 in step S5, then the sound P from the sound output unit 56 and the stored sound are compared with each other by the ear. If the sound P is the sound P2, P3, or P4, then the forecasting unit 52 forecasts a slop failure in step S6. After step S6, control returns to step S3 and the forecasting unit 52 repeats the processing from step S3.

If the sound P is the wind sound P5 in step S5, then control returns to step S3 and the forecasting unit 52 repeats the processing from step S3.

If the sound P is the presumed solid object rolling sound P6, then the forecasting unit 52 also forecasts a slop failure in step S6. After step S6, control returns to step S3 and the forecasting unit 52 repeats the processing from step S3.

In step S6, the forecasting unit 52 identifies the type of the sound P and issues a warning or identifies the type of the sound P and displays a warning on the screen of the display unit 54.

As described above, the forecasting apparatus 10 according to the first embodiment measures sounds P from the earth (the wind sound P5, the presumed solid object rolling sound P6) through the tree τ with the vibration sensor 12 as the sound measuring means, and predicts a slope failure based on a change in the sounds P from the earth measured by the vibration sensor 12.

Specifically, when the presumed root rupture sound P2 in the frequency range from 100 to 160 Hz, the presumed land movement sound P3 in the frequency range from 30 to 50 Hz, 60 Hz), the presumed underground water sound P4, or the presumed solid object rolling sound P6, other than the presumed noise sound P1 and the wind sound P5, is observed, the forecasting apparatus 10 forecasts a slope failure.

As a whole, when the forecasting apparatus 10 observes the generation of a sound P having a frequency range from 30 to 200 Hz while only the presumed noise sound P1 is being generated at an initial observation stage, the forecasting apparatus 10 can forecast a slope failure.

The forecasting apparatus 10 according to the first embodiment is capable of forecasting not only a slope failure based on a land movement, e.g., a landslide, but also a debris avalanche or a snow avalanche, as can be understood by those skilled in the art.

Therefore, the forecasting apparatus 10 according to the first embodiment can forecast local slope failures highly accurately which has been difficult to forecast.

The forecasting apparatus 10 is simple in arrangement as it is constructed of the vibration sensor 12, the sound observing device 14, and the data processing device 16.

Since the vibration sensor 12 is mounted on the tree τ by the belt 30, as shown in FIG. 4, the forecasting apparatus 10 can easily be installed. The sounds P from the earth can be detected through not only the tree τ, but also a solid object such as a stake or the like.

Figure 18:
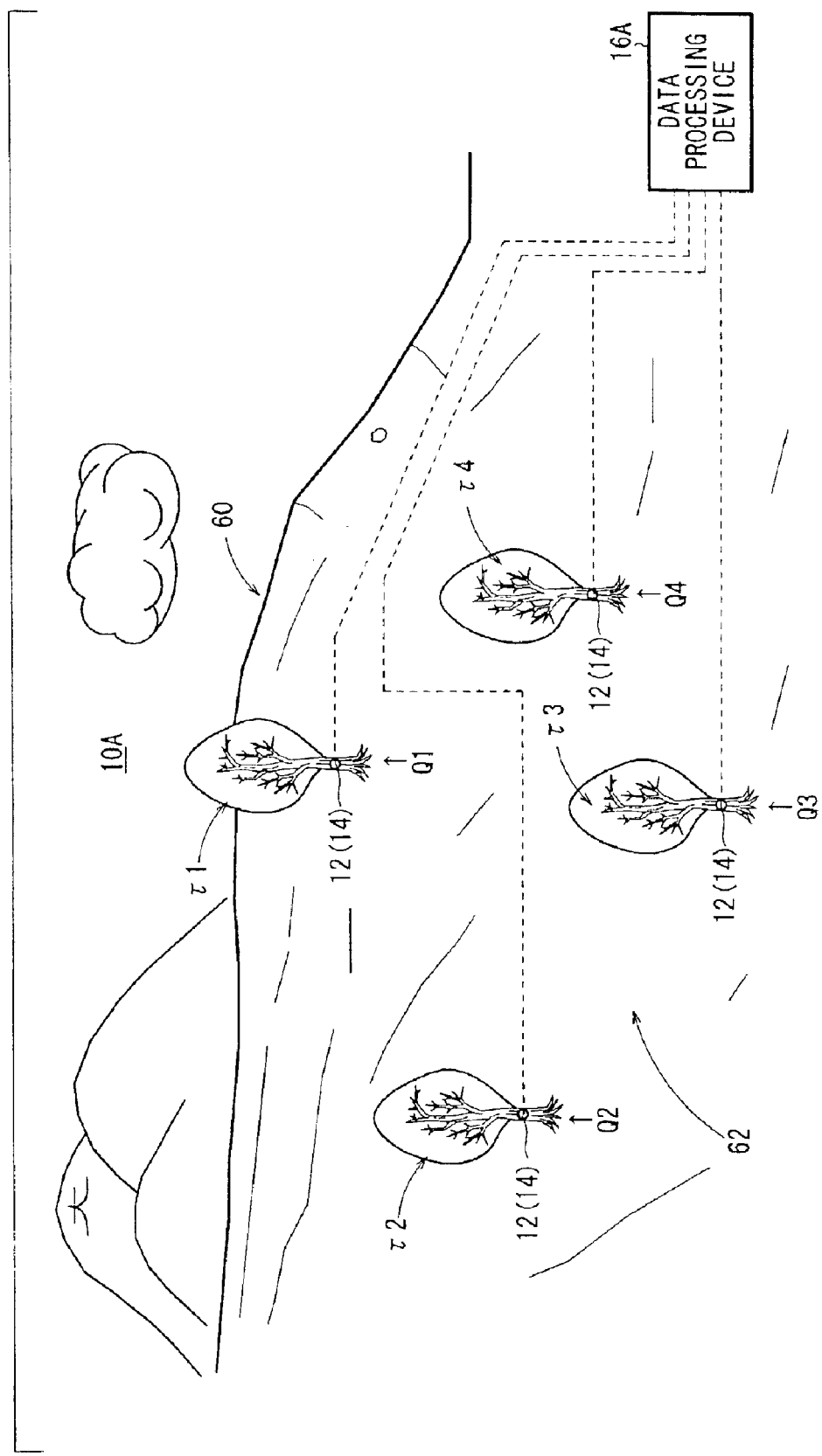
FIG. 18 is a schematic view of a modification of the slope failure forecasting apparatus shown in FIG. 1.

FIG. 18 shows a modified slope failure forecasting apparatus 10A according to the present invention.

As shown in FIG. 18, the slope failure forecasting apparatus 10A has four vibration sensors 12, each as a sound measuring means, disposed in respective at least four positions Q1, Q2, Q3, Q4 on a slope 62 extending downwardly from a peak 60, four sound observing devices 14 connected respectively to the vibration sensors 12, and a data processing device 16A which reads output signal voltages V from the sound observing devices 14. The data can be transmitted from the sound observing devices 14 to the data processing device 16A through a wireless communication link.

The data processing device 16A successively stores the output signal voltages V in a memory on a FIFO (First-In First-Out) basis. The memory can thus store data at present and data over a certain period of time in the past.

When the data processing device 16A observes sounds P (Pa through Pd) from the earth which have different delay times but have similar waveforms, e.g., the presumed land movement sound P3 as shown in FIG. 9, substantially simultaneously, the data processing device 16A can specify the position where the sounds P from the earth are produced, from the known four positions Q1 through Q4.

Figure 19:
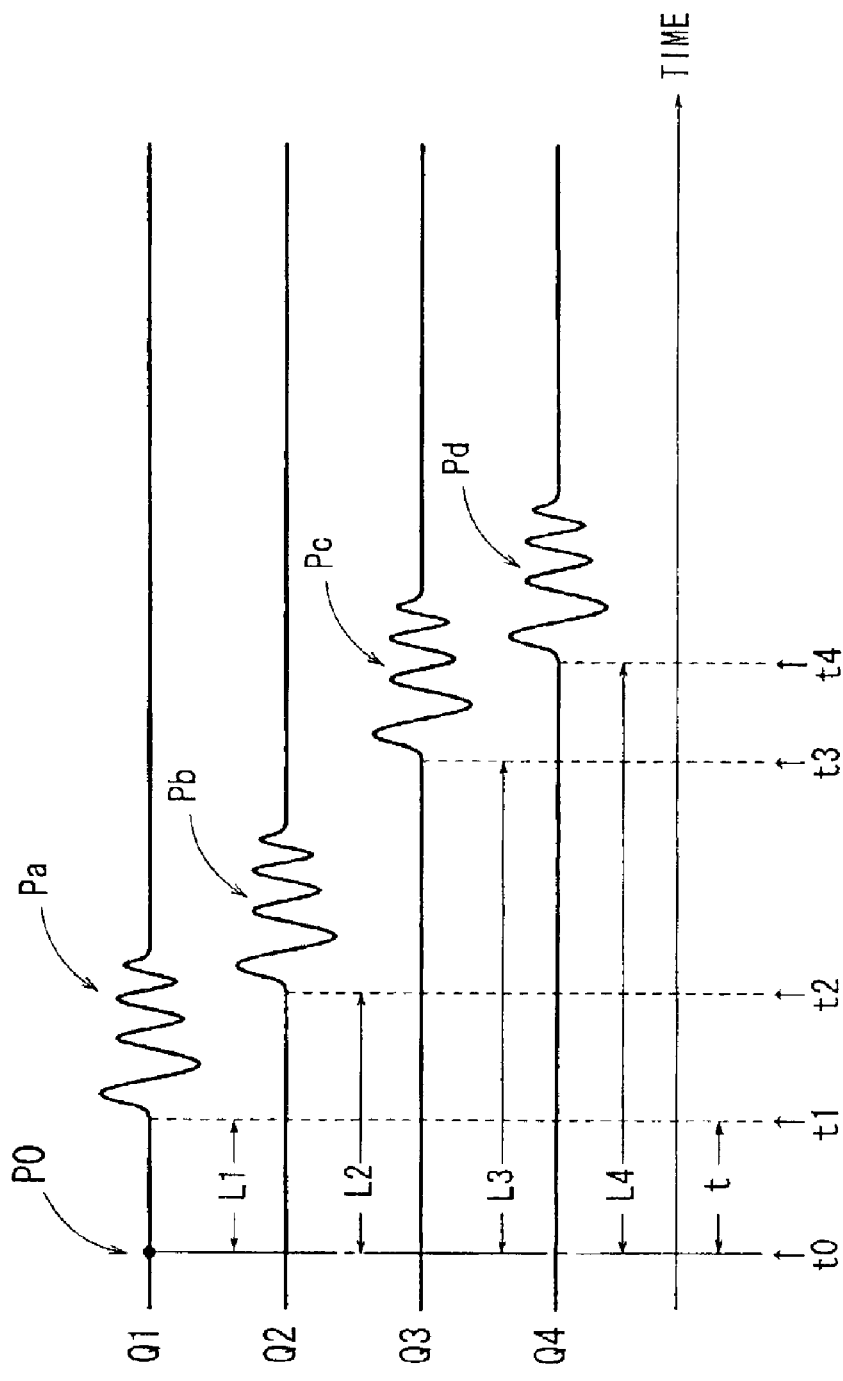
FIG. 19 is a diagram showing waveforms which are referred to in calculating a sound generating position.

Specifically, when the sounds Pa through Pd shown in FIG. 19 are observed in the respective positions Q1 through Q4 on the screen of the display unit 54 of the data processing device 16A, the sound Pa from the earth which has reached the data processing device 16A at an earliest time t0, and a linear distance L1 between a position P0 where the sound Pa from the earth is produced (a source of the sound P from the earth) and the position Q1 are used as a reference, and distances L2 through L4 up to the sounds Pb through Pd which have reached the respective positions Q2 through Q4 at respective times t2 through t4 with delays are determined according to "delay time×speed at which sounds are propagated in the ground". The speed at which sounds are propagated in the ground is measured in advance.

If the time required for sound waves to travel from the position P0 to the position Q1 is represented by t and the speed at which sounds are propagated in the ground by S, then the distances L1 through L4 can be determined by the following equations:

$$L1 = t \times S \quad (1)$$

$$L2 = (t+t2-t1) \times S \quad (2)$$

$$L2 = (t+t3-t1) \times S \quad (3)$$

$$L2 = (t+t4-t1) \times S \quad (4)$$

Figure 20:
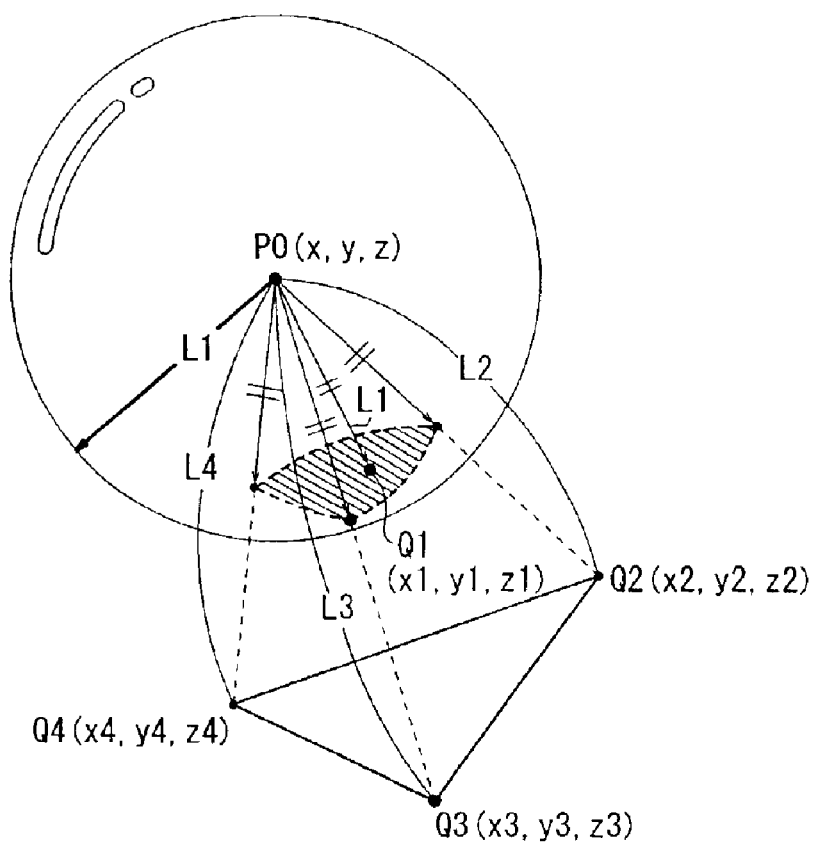
FIG. 20 is a diagram showing three-dimensional coordinate positions which are referred to in calculating a sound generating position.

If the position of the sounds P from the earth (see also FIG. 19) in a three-dimensional coordinate system is indicated by P0(x,y,z) as shown in FIG. 20, then the following equations (5) through (8) are satisfied:

$$L1 = ((x-x1)^2 + (y-y1)^2 + (z-z1)^2)^{1/2} \quad (5)$$

$$L2 = ((x-x2)^2 + (y-y2)^2 + (z-z2)^2)^{1/2} \quad (6)$$

$$L3 = ((x-x3)^2 + (y-y3)^2 + (z-z3)^2)^{1/2} \quad (7)$$

$$L4 = ((x-x4)^2 + (y-y4)^2 + (z-z4)^2)^{1/2} \quad (8)$$

By putting the right sides of the equations (5) through (8) in the left sides of the equations (1) through (4), the position of the sounds P from the earth can be determined from the resultant equations because the unknowns are the time t required for sound waves to travel from the position P0 to the position Q1 and the position of the sounds P from the earth. As can be seen from FIG. 20, the equations (5) through (8) are equations for determining the lengths of the edges of a triangular pyramid having a vertex P0 and bases Q2, Q3, Q4.

Figure 21:
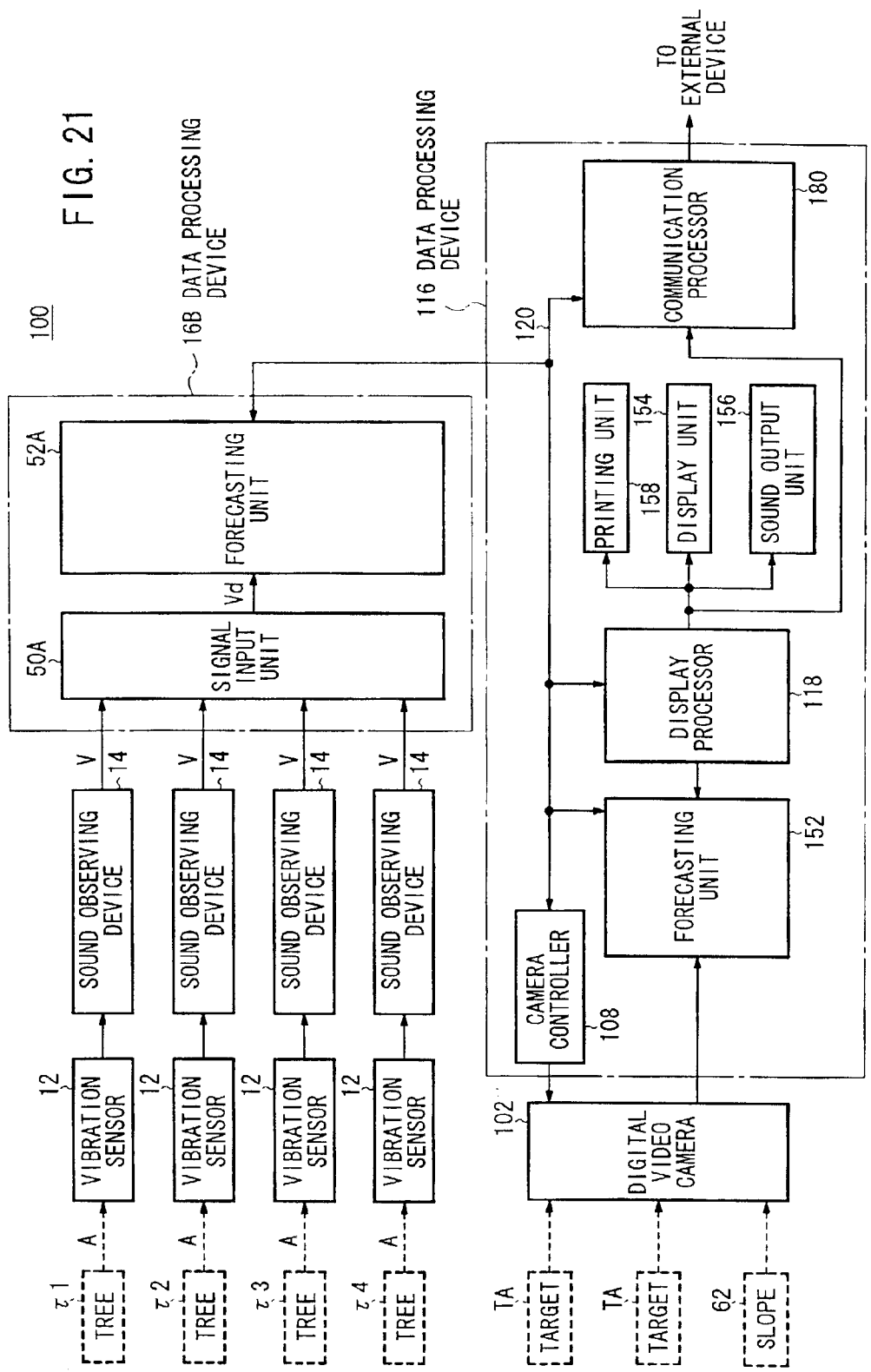
FIG. 21 is a block diagram of a slope failure forecasting system according to a second embodiment of the present invention.

2nd Embodiment: Slope Failure Forecasting System:

FIG. 21 shows a slope failure forecasting system 100 according to a second embodiment of the present invention. The slope failure forecasting system 100 has a function to forecast a slope failure and a function to watch a slope failure, and hence includes a function as a slope failure watching system.

Those parts of the slope failure forecasting system 100 shown in FIGS. 21 and 22 which are identical to those of the forecasting apparatus shown in FIGS. 1 and 18 are denoted by identical reference characters, and will not be described in detail below.

The slope failure forecasting system 100 basically comprises a plurality of vibration sensors 12 as a means for measuring sounds P from the earth, and a digital video camera 102 as a ground surface image capturing means for capturing an image of a slope 62 as a ground surface. The slope failure forecasting system 100 may have a single vibration sensor 12 if the position P0 of sounds P from the earth does not need to be identified.

The slope failure forecasting system 100 also has a data processing device 116 having a forecasting unit 152 which functions as a means for watching a slope failure or a means for forecasting a slope failure based on an output from a forecasting unit 52A which is included in a data processing device 16B to forecast a slope failure from a change in sounds P from the earth, and also based on a change in the image of the ground surface which is captured by the digital video camera 102.

The data processing device 116 comprises a personal computer, and has, in addition to the forecasting unit 152, a camera controller 108 for controlling the digital video camera 102, a printing unit 158 comprising a printer or the like, a display unit 154 comprising a plurality of display devices such as CRTs or the like, a sound output unit 156 such as a speaker or the like, a communication processor 180 for communication with an external device, and a display processor 118 for controlling the printing unit 158, the display unit 154, and the sound output unit 156.

The display processor 118 and the communication processor 180 are controlled by the forecasting unit 152. The camera controller 108, the forecasting units 52A, 152, the display processor 118, and the communication processor 180 are interconnected by a bus 120.

The digital video camera 102 has a field of view containing the slope 62 and also targets TA disposed in suitable positions on a tree τ (a tree τ in FIG. 22) and the slope 62 and used as subjects for positioning the digital video camera 102.

The digital video camera 102 is disposed in a position 122 which is spaced from the slope 62 and assumed to be immovable.

Figure 23:
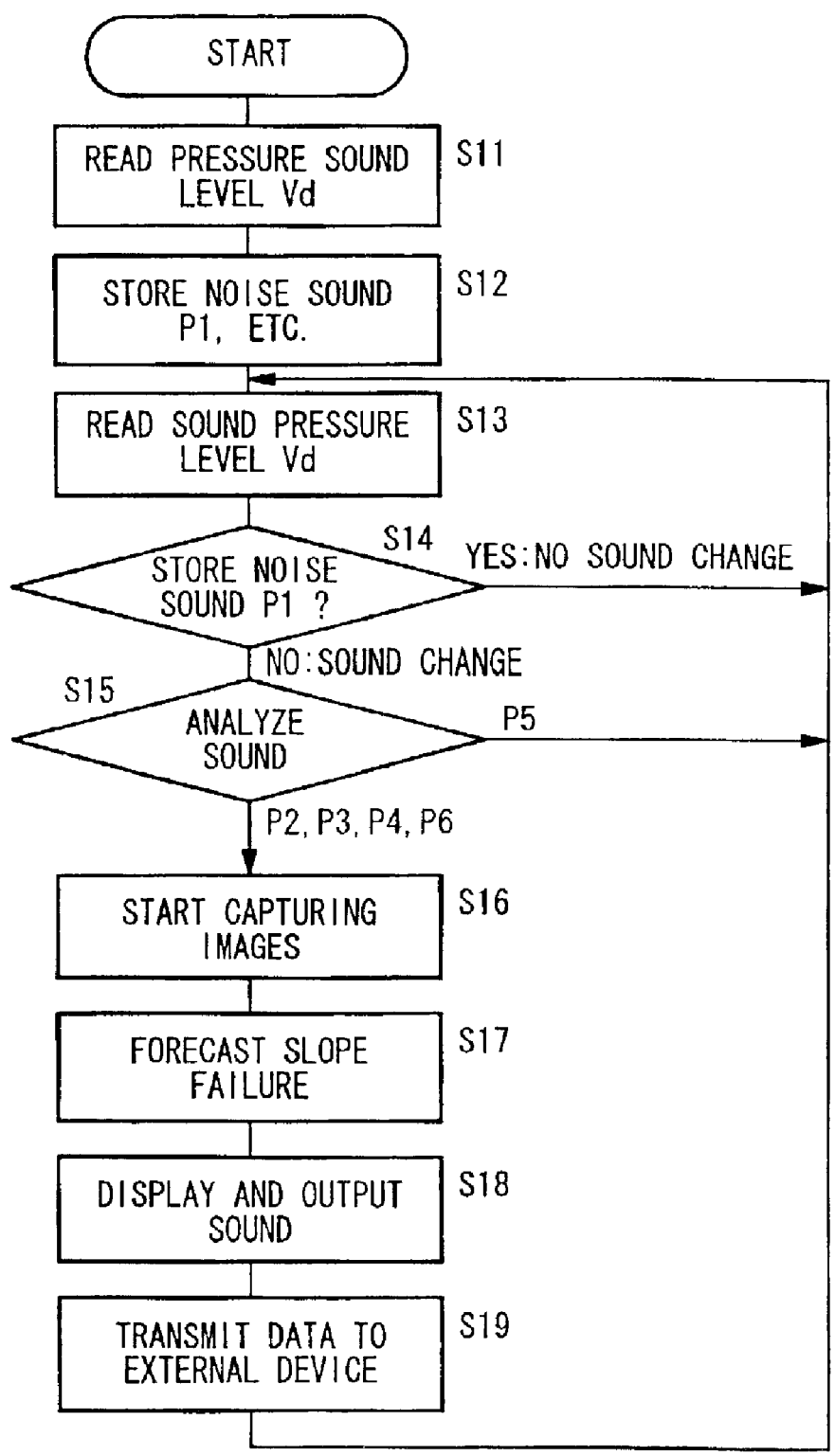
FIG. 23 is a flowchart of a forecasting process carried out by the slope failure forecasting system shown in FIGS. 21 and 22.

Operation of the slope failure forecasting system 100 thus constructed will be described below with reference to a flowchart shown in FIG. 23.

Steps S11 through S15 shown in FIG. 23 correspond to steps S1 through S5 shown in FIG. 17 of the sound observing device 14 in the forecasting apparatus 10 and will not be described in detail below.

After step S15 in which a sound P from the earth other than the presumed noise sound P1 is confirmed, the camera controller 108 controls the digital video camera 102 to start capturing an image of the slope including the targets TA at every given interval of time in step S16. Actually, before a sound P from the earth other than the presumed noise sound P1 is confirmed in step S15, the digital video camera 102 captures several images a day, and if a sound P from the earth other than the presumed noise sound P1 is confirmed in step S15, then the digital video camera 102 captures an image more frequently, i.e., at every given interval of time, e.g., every 5 minutes, every 10 minutes, every 30 minutes, every hour, depending on the type and amplitude of the sound. It is preferable to capture image data with the digital video camera 102 and read sound data with the sound observing device 14 synchronously at the same time.

In step S17, a process of watching and forecasting a slope failure is carried out based on the confirmed sound and the captured images.

Specifically, the forecasting unit 152 determines the difference between pixels of chronologically adjacent two of the images that have been read successively on a time-series basis by the digital video camera 102, for thereby detecting a change in the ground surface image.

If the forecasting unit 152 detects a change in the ground surface image which is of at least a certain value represented by the difference between pixels that is not considered to be of a noise level, then since the change in the sounds P from the earth has been confirmed in step S15, the forecasting unit 152 forecasts that there is a higher possibility of a slope failure.

In step S17, the forecasting unit 152 calculates the position P0(x,y,z) of the sound P from the earth according to the above equations (1) through (4). A chronological change in the position P0(x,y,z) of the sound P from the earth can also be used to forecast a slope failure.

In step S18, an image of the slope 62 in which an area showing a large change in the ground surface image is identified, e.g., marked, is displayed on the display unit 154, and the type of the sound confirmed in step S15, whether it is the presumed root rupture sound P2 or the presumed land movement sound P3, is displayed. The waveform and frequency distribution of the sound P from the earth can also be displayed simultaneously. In addition, the sound output unit 156 may output the sound P from the earth and a warning. It is also possible to display, on the display unit 154, a three-dimensional representation of the position P0 of the sound P from the earth (including its change).

The printing unit 158 outputs a hard copy showing the image displayed on the display unit 154, the waveform and frequency of the sound P from the earth, or the change in the position P0 of the sound P from the earth.

The sound data of the sound P from the earth and the image data of the ground surface, which have been acquired by the slope failure forecasting system 100, are transmitted to an external data collecting apparatus through a wired or wireless circuit network in step S19.

Figure 22:
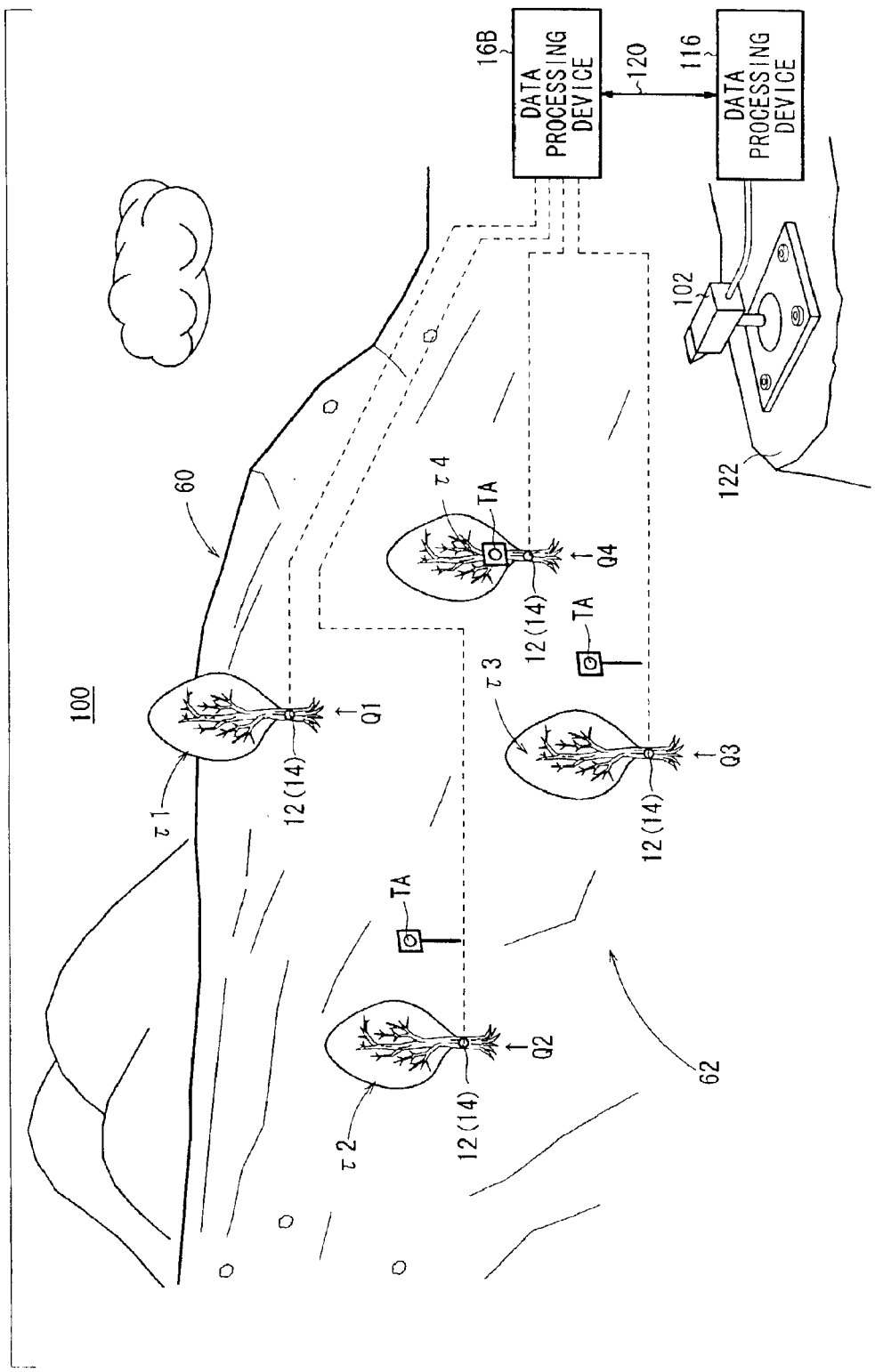
FIG. 22 is a schematic view showing an installed example of the slope failure forecasting system shown in FIG. 21.

As described above, the slope failure forecasting system 100 shown in FIGS. 21 and 22 watches a slope failure based on a change in the sound P from the earth and a change in the ground surface image, and forecasts a slope failure based on the result of the watching. Consequently, the slope failure forecasting system 100 is capable of forecasting a slope failure highly accurately.

3rd Embodiment: Long-term Weather Forecasting Apparatus:

As described above, the forecasting apparatus 10 shown in FIG. 1 doubles as a long-term weather forecasting apparatus according to a third embodiment of the present invention.

The forecasting apparatus 10 which serves as a long-term weather forecasting apparatus comprises a vibration sensor 12 as a means for measuring sounds propagated through the ground, a sound observing device 14, and a data processing device 16.

When the forecasting apparatus 10 functions as a long-term weather forecasting apparatus, the vibration sensor 12 and the sound observing device 14 function in the same manner as those of the forecasting apparatus 10 which functions as a slope failure forecasting apparatus, but the data processing device 16 performs a modified process.

The signal input unit 50 of the data processing device 16 reads the signal voltage V from the signal output unit 46 of the sound observing device 14 at every interval of time. For example, the signal input unit 50 reads the signal voltage V continuously for 30 seconds at every 10 minutes. The signal input unit 50 converts the signal voltage V into a digital signal as a sound pressure level Vd corresponding to the sound pressure of the sounds P. The sound pressure level Vd is supplied to and stored in the data memory 51 by the forecasting unit 52. At this time, the data memory 51 stores successive sound pressure levels Vd as time-series data, each at an address represented by year, month, date, time (Yyyy; Mm; Dd; Hh; Mm).

The data memory 51 thus stores data of the sound pressure levels Vd for one day, five days, or one month, which have been read continuously for 30 seconds at every 10 minutes.

The forecasting unit 52 performs a long-term weather forecasting process based on the data of the sound pressure levels Vd stored in the data memory 51. Specifically, the forecasting unit 52 determines an average of the data of the sound pressure levels Vd for one day, or determines a moving average of data of the sound pressure levels Vd for several days, arranges the average values for one month on a time-series basis, and produces a long-term weather forecast based on the average values thus arranged. If one month of data has not been accumulated in the data memory 51, then the forecasting unit 52 sends a command to record the signal voltage V continuously to the signal input unit 50.

The weather forecast obtained by the forecasting unit 52 is stored in the data memory 51, and then supplied to the display unit 54 such as a CRT, a liquid crystal display panel, or the like, and also to the printing unit 58 such as a printer or the like.

The data of the sound pressure levels Vd are converted into a sound signal, if necessary, by the forecasting unit 52. The sound signal is outputted as a sound by the sound output unit 56 such as a speaker or the like.

Figure 24:
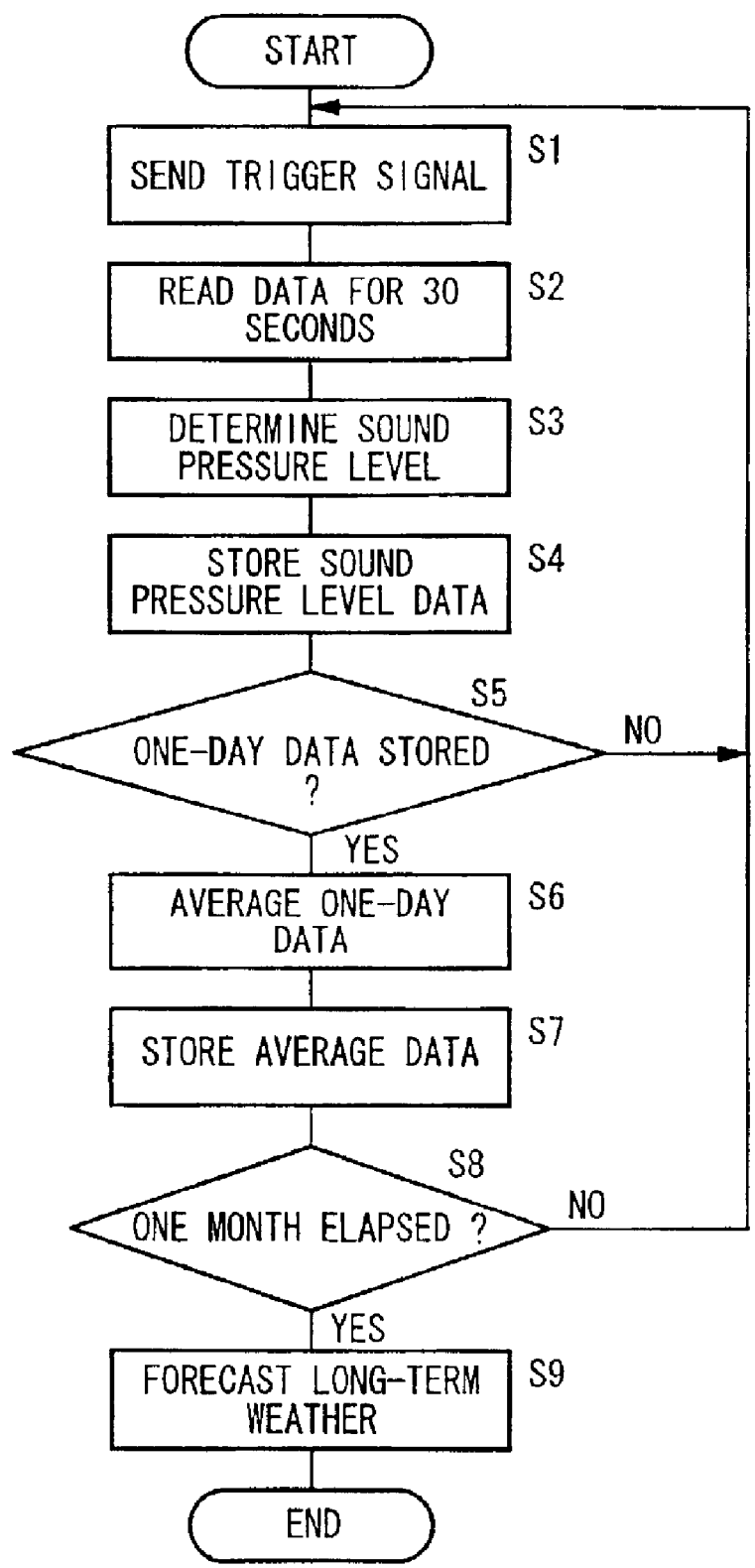
FIG. 24 is a flowchart of a weather forecasting process carried out by a long-term weather forecasting process provided by the slope failure forecasting apparatus shown in FIG. 1.

A weather forecasting process which is carried out by the forecasting apparatus 10 thus constructed will be described below with reference to FIG. 24. The signal processing in the weather forecasting process is mainly carried out by the forecasting unit 52.

A sound A transmitted through the tree $\tau$ to the vibration sensor 12 is converted into a signal voltage V by the vibration sensor 12. The signal voltage V is continuously supplied to the signal input unit 50 of the data processing device 16 through the sound observing device 14 which includes the signal amplifier 40, the noise filter 42, and the signal output unit 46.

The signal voltage V that is continuously supplied to the signal input unit 50 has a frequency band from 16 Hz to 1600 Hz. The signal voltage V has large amplitudes in a frequency range from 30 Hz to 700 Hz and a frequency range from 30 Hz to 200 Hz in the above frequency band.

While the signal voltage V corresponding to the sound A is being continuously supplied to the signal input unit 50, the clock unit 53 having calendar and clock functions sends a trigger signal to the forecasting unit 52 in every 10 minutes in step S1.

In step S2, the forecasting unit 52 instructs the signal input unit 50 to read data of sounds from the earth for 30 seconds from the time it has received the trigger signal. The signal input unit 50 then converts the signal voltage V into digital data continuously for 30 seconds, and transmits the digital data as a sound pressure level Vd to the forecasting unit 52. The digital data of the sound pressure level Vd for 30 seconds is then stored in the data memory 51.

In step S3, the signal input unit 50 processes the digital data of the sound pressure level Vd for 30 seconds which is stored in the data memory 51, and determines a sound pressure level Vd as a representative value of the digital data for 30 seconds.

Specifically, the signal input unit 50 converts the digital data of the sound pressure level Vd for 30 seconds according to a fast Fourier transformation, and determines a value of greatest power in the obtained frequency spectrum as a sound pressure level Vd as a representative value of the digital data for 30 seconds.

In step S4, the data of the sound pressure level Vd thus determined as the representative value of the digital data for 30 seconds is determined as the data of the sound pressure level Vd at the time measured in step S1 (when the trigger signal was produced). The determined data is stored in the data memory 51 at an address represented by the year, month, date, time when it was measured.

In step S5, the forecasting unit 52 determines whether the data of the sound pressure levels Vd stored at respective addresses in the data memory 51 have been accumulated for one day, i.e., the day when the data are measured, or not. If the answer to step S5 is negative, and the data of the sound pressure levels Vd determined every 10 minutes have not been accumulated for one day in the data memory 51, then the forecasting unit 52 repeats the processing in steps S1 through S5 to accumulate data of sound pressure levels Vd determined every 10 minutes in the data memory 51.

If the answer to step S5 is affirmative, and the data of the sound pressure levels Vd determined every 10 minutes have been accumulated for one day in the data memory 51, then control goes to step S6.

In step S6, the forecasting unit 52 averages the data of the sound pressure levels Vd determined for one day, e.g., determines an arithmetic mean of the data.

In step S7, the forecasting unit 52 stores the average data as data of a sound pressure level Vd as a representative value of the day in the data memory 51 at an address represented by the year, month, date, time.

In step S8, the forecasting unit 52 determines whether the data of sound pressure levels Vd as representative values of the days have been accumulated for one month or not. Until the answer to step S8 becomes affirmative, the processing in steps S1 through S8 is repeated.

If the data of sound pressure levels Vd as representative values of the days have been accumulated for one month, then the answer to step S8 becomes affirmative.

In step S9, the forecasting unit 52 produces a long-term weather forecast based on the data, accumulated for one month, of sound pressure levels Vd as representative average values of the days.

FIG. 25 shows the location where a long-term weather forecasting process carried out by the forecasting apparatus 10 shown in FIG. 1, and the spot where temperatures were observed for the purpose of comparison with the results of the long-term weather forecasting process thus carried out.

Sounds from the earth were measured and the long-term weather forecasting process was carried out using a tree $\tau$ in a lot in Nagaoka City, Niigata Prefecture, Japan owned by the assignee of the present application. The tree $\tau$ on which the vibration sensor 12 was mounted for measuring sounds from the earth was a Japanese fir, about 2.5 m high and about 5 cm diameter. The vibration sensor 12 was mounted on the tree $\tau$ at a height of about 1 m for measuring sounds P from the earth. A signal voltage V produced by the vibration sensor 12 from sounds P from the earth was read into the sound observing device 14. The data processing device 16 produced a long-term weather forecast, i.e., forecast temperature differences in a long range at the measured spot.

Temperatures were measured in a snow removal base located in Nakanoshima-cho, Niigata Prefecture, which is 5.9 km spaced straight from the spot where the sounds from the earth were measured.

Since the spots where the sounds from the earth and the temperatures were measured are positioned in a plain, almost no geographical factors are considered to affect the long-term weather forecast.

FIGS. 26A through 26D show a concept of the long-term weather forecasting process thus carried out.

FIG. 26A shows a chronological array (see •) of sound pressure levels Vd of days over one month (month X) which were processed by the data processing device 16. Each of the sound pressure levels Vd is an average value of the data of sound pressure levels Vd in one day stored in the data memory 51. In FIG. 26A, the sound pressure level Vd represented by the vertical axis increases, i.e., the amplitude of the sound pressure level Vd increases, downwardly along the vertical axis.

FIG. 26B shows a curve Ca approximating changes in the sound pressure level Vd represented by moving averages of sound pressure levels Vd calculated for the respective days. The curve Ca is also referred to as a measured curve Ca or a measured waveform Ca. For a better understanding of the present invention, a curve will also be considered to be a waveform.

The moving average referred to herein is an average of data measured over several day. For example, if the moving average is an average of data measured over 3 days, then the moving average of the measured data for a certain measured day is indicated by ((Vd of the measured day preceding the certain measured day)+(Vd of the certain measured day)+(Vd of the measured day following the certain measured day))/3. The graph shown in FIG. 26B represents a curve approximating changes in the sound pressure level Vd, which is produced by applying polynomial approximation to the moving average data of FIG. 26A. The moving average was employed for the purpose of smoothing abrupt changes in the sounds P from the earth. The moving average may be obtained over a number of days ranging from 2 days to several days, rather than 3 days. The long-term weather forecasting process may be carried out without using the moving average, or using another averaging process.

FIG. 26C shows a long-term weather forecasting curve Cb of the month (X+3) after 3 months from the measured month X. In FIG. 26C, the measured curve Ca which approximates the sound pressure levels Vd shown in FIG. 26B is used as a long-term weather forecasting curve Cb of the month (X+3). As the amplitude of the sound pressure level Vd of the measured month X is large, it is determined that the climate will be cold with lower temperatures in the month (X+3) than a monthly average temperature in the past. If the amplitude of the sound pressure level Vd of the measured month X is small, it is determined that the climate will be warm with higher temperatures in the month (X+3) than a monthly average temperature in the past. The long-term weather forecasting curve Cb (FIG. 26C) of the month (X+3) represents a waveform which is in phase with the measured curve Ca (FIG. 26B) of the month (X+3). In the graph shown in FIG. 26C, the horizontal axis plotted centrally between hotter and colder levels represents the monthly average temperature in the past. The monthly average temperature in the past represents an average value of temperatures of the same month in several years in the past.

More specifically, in FIGS. 26B and 26C, a temperature forecast is made depending on the magnitude of the sound pressure level Vd of the sounds P from the earth measured on a certain day of the month X (e.g., the 2nd day of the month X). For example, a temperature forecast is made to indicate that it will be colder than the monthly average temperature in the past, three months after the day when relatively large sounds were measured, e.g., on the corresponding day (the 2nd day) of the month (X+3), and it will be warmer than the monthly average temperature in the past, three months after the day when relatively small sounds were measured, e.g., around the corresponding day, i.e., the 4th day of the month (X+3).

FIG. 26D shows a long-term weather forecasting curve Cc of the month (X+6) after 6 months from the measured month X in FIG. 26B. In FIG. 26D, the average value of the measured curve Ca of the month X is defined as a reference level, and the waveform of the measured curve Ca is inverted about the reference level, thus producing the long-term weather forecasting curve Cc. Therefore, the reference level represents a monthly average temperature of the month (X+6).

According to the weather forecast of the month (X+6) shown in FIG. 26D, unlike the weather forecast of the month (X+3) shown in FIG. 26C, as the amplitude of the sound pressure level Vd of the month X is large, it is determined that the climate will be warmer with relatively high temperatures in the month (X+6), and if the amplitude of the sound pressure level Vd of the month X is small, it is determined that the climate will be colder with relatively low temperatures in the month (X+6). Stated otherwise, the long-term weather forecasting curve Cb (FIG. 26D) of the month (X+6) represents a waveform which is in opposite phase with the measured curve Ca (FIG. 26B) of the month X.

More specifically, in FIGS. 26B and 26D, a temperature forecast is made depending on the magnitude of the sound pressure level Vd of the sounds P from the earth measured on a certain day of the month X (e.g., the 2nd day of the month X). For example, a temperature forecast is made to indicate that it will be warmer with relatively high temperatures, six months after the day when relatively large sounds were measured, e.g., on the corresponding day (the 2nd day) of the month (X+6), and it will be colder with relatively low temperatures, six months after the day when relatively small sounds P from the earth were measured, e.g., around the corresponding day, i.e., the 4th day of the month (X+6).

If the difference between the temperatures at the start and end of a month is large, e.g., if there is a 5° C. temperature difference of 5° C. or greater between the start and end of a month, then the reference level referred to above should preferably be a straight line interconnecting the value of the approximate curve at the start of the month (corresponding to the temperature at the start of the month) and the value of the approximate curve at the end of the month (corresponding to the temperature at the end of the month), rather than the average of the approximate curve (corresponding to the monthly average temperature). If the data of sound pressure levels Vd have been accumulated over many years, then the data of sound pressure levels Vd of the corresponding months may be averaged to calculate an arithmetic mean, which may be used as the reference level.

Specific examples of the long-term weather forecasting process described above with reference to FIGS. 26A through 26D will be described below.

FIG. 27A shows a measured curve 100 based on changes in the sound pressure level Vd in Nagaoka City, Niigata Prefecture (see FIG. 25), in August, 2000. FIG. 27B shows a weather forecasting curve 102 of a long-term weather forecast in the vicinity of Nagaoka City in November, 2000 (after three months), predicted from the results of the sound pressure levels Vd. FIG. 27C shows a curve 104 of actual temperature changes in the snow removal base (see FIG. 25) in the same month (November, 2000).

As shown in FIG. 27A, the sound pressure level Vd in August has its waveform amplitude smaller in some days at the start of the month, but tending to become larger as a whole toward the end of the month. It can thus be predicted that it will be cold up to the end of November, from the weather forecasting curve 102 of the long-term weather forecast for November shown in FIG. 27B based on the measured data in August. The curve 104 of actual temperature changes (also referred to as "temperature waveform") shown in FIG. 27C indicates that the temperature was about 10° C. at the start of the month, but dropped nearly to 0° C. at the end of the month. First snowfall was recorded in the Niigata Prefecture on November 28. The forecasting apparatus 10 according to the present invention is thus capable of forecasting warm and cold climates highly accurately, and also forecasting first snowfall highly accurately.

FIG. 28A shows a measured curve 106 based on changes in the sound pressure level Vd in Nagaoka City, Niigata Prefecture (FIG. 25), in September, 2000. FIG. 28B shows a weather forecasting curve 108 of a long-term weather forecast in the vicinity of Nagaoka City in December, 2000 (after three months), predicted from the results of the sound pressure levels Vd. FIG. 28C shows a curve 110 of actual temperature changes in the snow removal base (see FIG. 25) in the same month (December, 2000).

As shown in FIG. 28B, the weather forecasting curve 108 of the long-term weather forecast indicates a cold climate with lower temperatures than the monthly average temperature in the past throughout December. It can thus be predicted that it will be cold up to the end of December, based on the measured data in September. The curve 110 of actual temperature changes shown in FIG. 28C indicates that the temperature of about 0° C. continued from the start of the month, and dropped below 0° C. at the end of the month. Lingering snow, i.e., snow that remains unthawed until the snow-thawing season, was recorded in plains in the Niigata Prefecture on December 26. The forecasting apparatus 10 according to the present invention is thus capable of forecasting warm and cold climates highly accurately, and also forecasting lingering snow highly accurately.

FIG. 29A shows a measured curve 112 based on changes in the sound pressure level Vd in Nagaoka City, Niigata Prefecture (FIG. 25), in October, 2000. FIG. 29B shows a weather forecasting curve 114 of a long-term weather forecast in the vicinity of Nagaoka City in January, 2001 (after three months), predicted from the results of the sound pressure levels Vd. FIG. 29C shows a curve 116 of actual temperature changes in the snow removal base (see FIG. 25) in the same month (January, 2001).

As shown in FIG. 29B, as with the forecast for December, the weather forecasting curve 114 of the long-term weather forecast indicates a cold climate with lower temperatures than the monthly average temperature in the past throughout January. It can thus be predicted that it will be cold up to the end of January following December, based on the measured data in October. The curve 116 of actual temperature changes shown in FIG. 29C indicates that the temperature below 0° C. continued from the start to end of the month, in a pattern corresponding to the weather forecasting curve 114 shown in FIG. 29B.

FIG. 30A shows a measured curve 118 based on changes in the sound pressure level Vd in Nagaoka City, Niigata Prefecture (FIG. 25), in August, 2000. FIG. 30B shows a weather forecasting curve 120 of a long-term weather forecast in the vicinity of Nagaoka City in February, 2001 (after six months), predicted from the results of the sound pressure levels Vd. FIG. 30C shows a curve 122 of actual temperature changes in the snow removal base (FIG. 25) in the same month (February, 2001).

As shown in FIG. 30B, the weather forecasting curve 120 of the long-term weather forecast indicates a cold climate with lower temperatures than the monthly average temperature in the past at the start of February, but indicates a warmer climate toward the end of February. It can thus be predicted that it will be cold at the start of February, but will become warmer at the end of February, based on the measured data in August. The curve 122 of actual temperature changes shown in FIG. 30C indicates that the temperature below 0° C. continued at the start of the month, but rose to about 0° C. at the end of the month, in a pattern corresponding to the weather forecasting curve 120 shown in FIG. 30B.

Figure 31A:
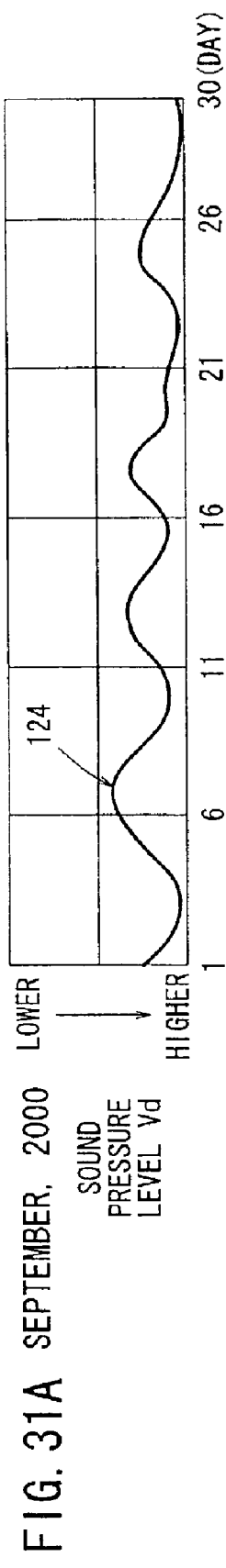
FIG. 31A is a diagram showing a curve of sounds from the earth measured in September, 2000.
Figure 31B:
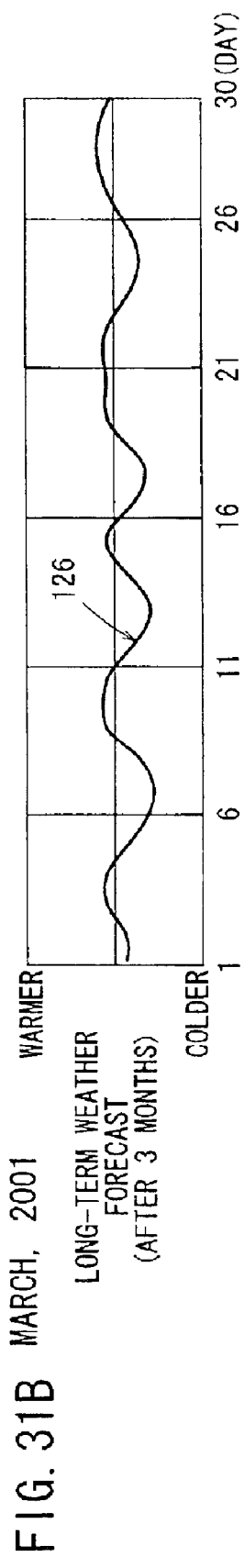
FIG. 31B is a diagram showing a weather forecasting curve for March, 2001 which is 6 months after September, 2000.
Figure 31C:
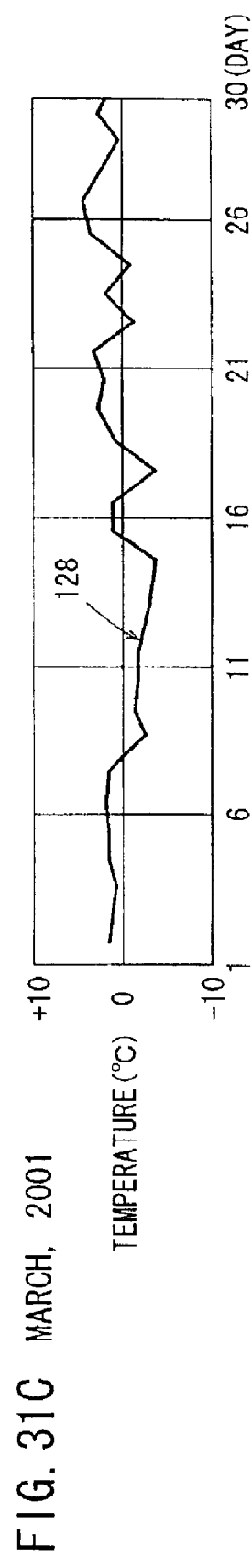
FIG. 31C is a diagram showing a curve of temperatures measured in March, 2001.

FIG. 31A shows a measured curve 124 based on changes in the sound pressure level Vd in Nagaoka City, Niigata Prefecture (FIG. 25), in September, 2000. FIG. 31B shows a weather forecasting curve 126 of a long-term weather forecast in the vicinity of Nagaoka City in March, 2001 (after six months), predicted from the results of the sound pressure levels Vd. FIG. 31C shows a curve 128 of actual temperature changes in the snow removal base (FIG. 25) in the same month (March, 2001).

As shown in FIG. 31B, the weather forecasting curve 126 of the long-term weather forecast stays nearly centrally in the graph throughout March. The weather forecasting curve 126 predicts, therefore, that, unlike the forecasts for January and February, in March it will be warm with relatively high temperatures close to the average monthly temperature in the past in the entire month. The curve 128 of actual temperature changes shown in FIG. 31C indicates that the temperature near 0° C. continued from the start of the month to a middle part of the month, but rose above 0° C. at the end of the month, in a pattern corresponding to the weather forecasting curve 126 shown in FIG. 31B.

The measured curves of the sound pressure levels Vd and the long-term weather forecasting curves shown in FIGS. 27A through 31C are displayed on the screen of the display unit 54 shown in FIG. 1, and also outputted as a hard copy from the printing unit 58 for use by the user.

According to the third embodiment described above, based on the finding by the inventor that a climate three months ahead of a measured month changes in phase with the climate in the measured month and a climate six months ahead of the measured month changes in opposite phase with the climate in the measured month, a long-term weather forecast can be made to predict climate conditions such as cold and warm temperatures after three or six months much more accurately than with the conventional forecasting apparatus, based on measured data of sounds P from the earth in the measured month. It is also expected that a climate nine months after the measured month changes in phase with the climate in the measured month and a climate twelve months after the measured month changes in opposite phase with the climate in the measured month.

The periods of three months and six months referred to above are determined based on the length of one year. Specifically, if the length of one year is 365 days and 6 hours, then the length of three months is $(365 \times 24+6) \times 3/12 =$ 2191.5 hours, i.e., 91 days, 7 hours, and 30 minutes, and the length of six months is 182 days and 15 hours.

Figure 32:
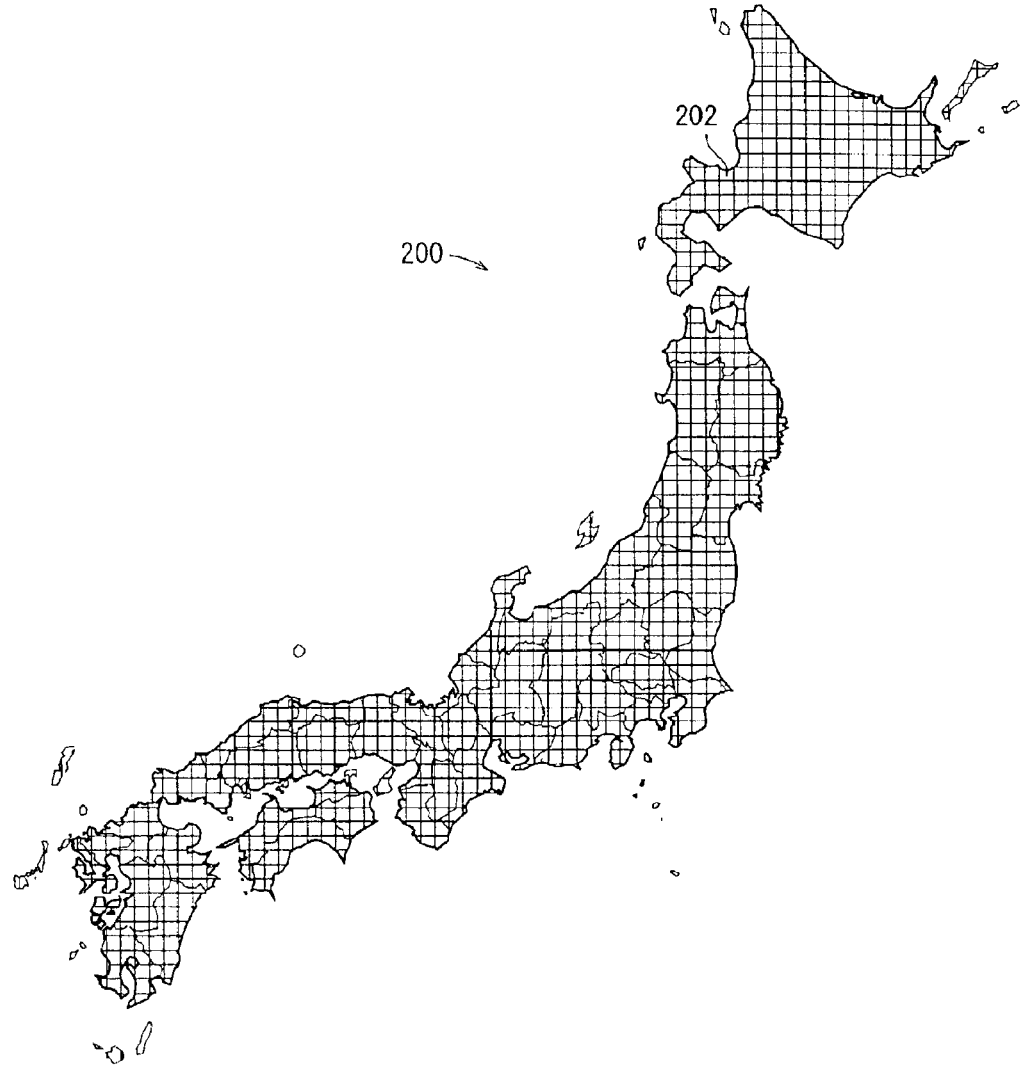
FIG. 32 is a view showing observation spots for observing sounds from the earth, placed all over a country.
Figure 33:
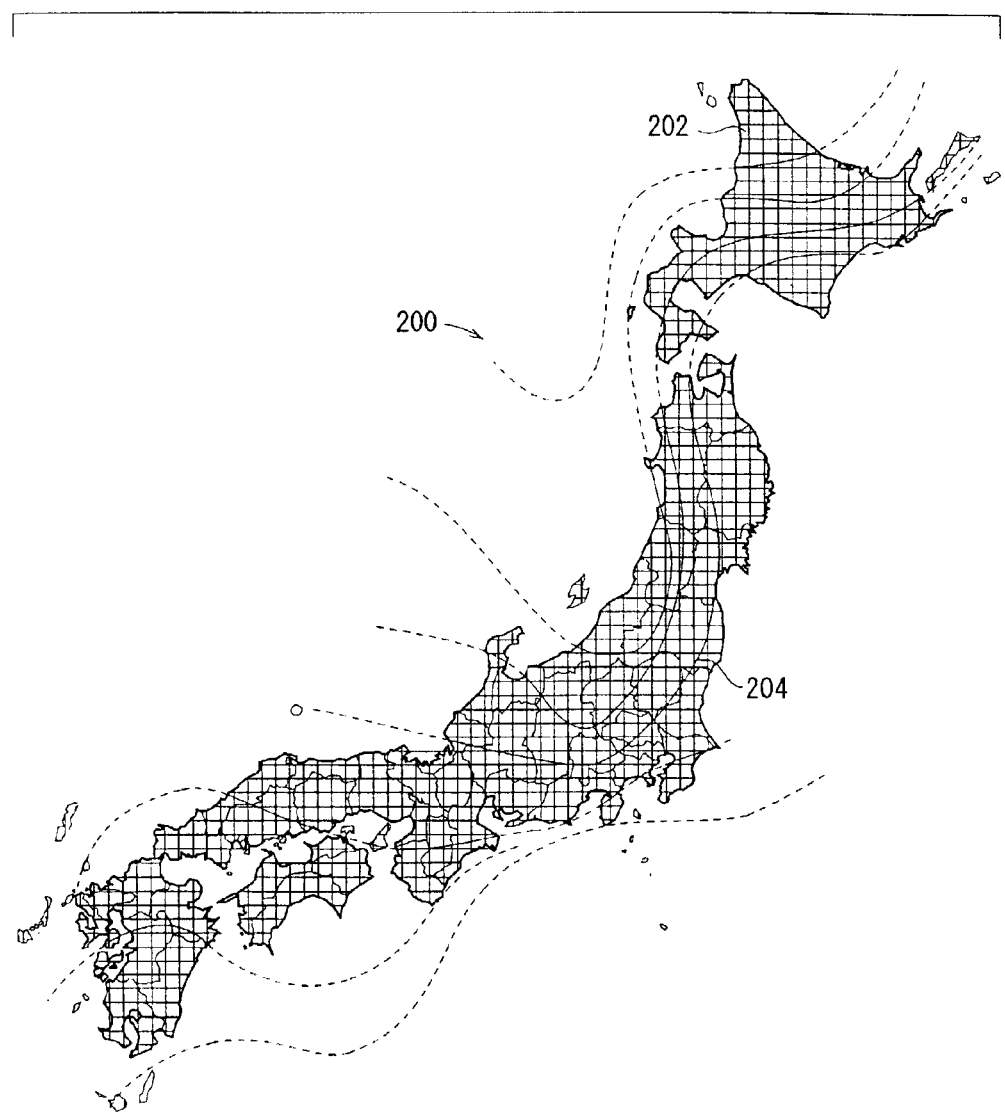
FIG. 33 is a view showing an isobaric representation of sounds from the earth all over a country.

As shown in FIG. 32, a country, such as Japan 200, is divided into square areas each having sides, 20 km long, and a telemeter including the vibration sensor 12, the sound observing device 14, and the data processing device 16 and having a data transmitting function is placed in or near each point of intersection of the sides of square areas. The telemeters serve as observation points for observing sounds from the earth. Data representing observed sounds from the earth are transmitted at fixed times to a certain location, not shown, where a data analyzing apparatus and a forecasting apparatus are located. In response to the data transmitted from the telemeters, the data analyzing apparatus and the forecasting apparatus draws a present plot of isobars 204 of observed sounds from the earth as shown in FIG. 33. Based on an isobaric representation of the isobars 204, a plot of isobars after three or fix months can be drawn to predict long-term weather conditions not only at the observation points but also over the entire country.

According to the present invention, it is possible to forecast long-term weather conditions such as warm and cold climates related to high and low temperatures highly accurately based on the present magnitude of sounds from the earth.

According to the present invention, furthermore, it is possible to accurately watch and forecast slope failures such as landslides, etc., and it is possible to watch and forecast slope failures such as landslides, etc. according to a simple process. Therefore, the cost required to watch and forecast slope failures such as landslides, etc. may be relatively low.

Although certain preferred embodiments of the present invention have been shown and described in detail, it should be understood that various changes and modifications may be made therein without departing from the scope of the appended claims.

What is claimed is:

1. An apparatus for forecasting long-term temperature conditions, comprising:

means for measuring sounds from the earth; and forecasting means for forecasting long-term temperature conditions based on a change in the measured sounds from the earth, wherein said forecasting means forecasts temperatures of a corresponding day of the month at three months after a day when said sounds from the earth are measured; and said forecasting means forecasts that the temperature on or around said corresponding day will be lower than a past average temperature of the month if the magnitude of sounds from the earth is relatively large, and forecasts that the temperature on or around said corresponding day will be higher than the past average temperature of the month if the magnitude of said sounds from the earth is relatively small.

2. An apparatus according to claim 1, wherein the magnitude of sounds from the earth comprises an average of the magnitudes of the sounds from the earth.

3. An apparatus according to claim 1, wherein said means for measuring sounds from the earth comprises:

means for measuring said sounds from the earth through a tree on the earth.

4. An apparatus according to claim 1, further comprising:

means for measuring sounds from the earth simultaneously in at least four sites, and means for calculating a position in which said sounds from the earth are produced, based on simultaneous observation of said sounds from the earth in said at least four sites.

5. A method of forecasting long-term temperature conditions, comprising the steps of:

measuring sounds from the earth; and forecasting long-term temperature conditions based on a change in the measured sounds from the earth, wherein said forecasting step comprises:

forecasting temperatures of a corresponding day of the month at three months after a day when said sounds from the earth are measured;

forecasting that the temperature on or around said corresponding day will be lower than a past average temperature of the month if the magnitude of sounds from the earth is relatively large;

forecasting that the temperature on or around said corresponding day will be higher than the past average temperature of the month if the magnitude of said sounds from the earth is relatively small.

6. An apparatus for forecasting long-term temperature conditions, comprising:

means for measuring sounds from the earth; and forecasting means for forecasting long-term temperature conditions based on a change in the measured sounds from the earth, wherein said forecasting means forecasts temperatures of a corresponding day of the month at six months after a day when said sounds from the earth are measured; and said forecasting means forecasts that the temperature on or around said corresponding day will be higher than a past average temperature of the month if the magnitude of sounds from the earth is relatively large, and forecasts that the temperature on or around said corresponding day will be lower than the past average temperature of the month if the magnitude of said sounds from the earth is relatively small.

7. An apparatus according to claim 6, wherein the magnitude of sounds from the earth comprises an average of the magnitudes of the sounds from the earth.

8. An apparatus according to claim 6, wherein said means for measuring sounds from the earth comprises:

means for measuring said sounds from the earth through a tree on the earth.

9. An apparatus according to claim 6, further comprising:

means for measuring sounds from the earth simultaneously in at least four sites, and means for calculating a position in which said sounds from the earth are produced, based on simultaneous observation of said sounds from the earth in said at least four sites.

10. A method of forecasting long-term temperature conditions, comprising the steps of:

measuring sounds from the earth; and forecasting long-term temperature conditions based on a change in the measured sounds from the earth, wherein said forecasting step further comprises:

forecasting temperatures of a corresponding day of the month at six months after a day when said sounds from the earth are measured;

forecasting that the temperature on or around said corresponding day will be higher than a past average temperature of the month if the magnitude of sounds from the earth is relatively large; and forecasting that the temperature on or around said corresponding day will be lower than the past average temperature of the month if the magnitude of said sounds from the earth is relatively small.

* * * * *